US010848572B2

(12) United States Patent
Sagar et al.

(10) Patent No.: US 10,848,572 B2
(45) Date of Patent: *Nov. 24, 2020

(54) INTERNET CLOUD-HOSTED NATURAL LANGUAGE INTERACTIVE MESSAGING SYSTEM SERVER COLLABORATION

(71) Applicant: Oracle International Corporation, Redwood Shores, CA (US)

(72) Inventors: Akash Sagar, Redwood City, CA (US); Anush Kumar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,135

(22) Filed: Feb. 25, 2019

(65) Prior Publication Data

US 2019/0190995 A1 Jun. 20, 2019

Related U.S. Application Data

(63) Continuation of application No. 15/462,649, filed on Mar. 17, 2017, now Pat. No. 10,270,864.
(Continued)

(51) Int. Cl.
*G06F 15/16* (2006.01)
*H04L 29/08* (2006.01)
(Continued)

(52) U.S. Cl.
CPC .......... *H04L 67/148* (2013.01); *G06F 40/205* (2020.01); *G06F 40/30* (2020.01);
(Continued)

(58) Field of Classification Search
USPC .... 726/2; 709/204, 206, 203, 217, 219, 223, 709/224, 226, 228, 230, 232, 238
See application file for complete search history.

(56) References Cited

U.S. PATENT DOCUMENTS 7,181,492 B2 2/2007 Wen et al.
7,356,567 B2 4/2008 Odell et al.
(Continued)

FOREIGN PATENT DOCUMENTS

EP 743609 11/1996
EP 2579157 4/2013
(Continued)

OTHER PUBLICATIONS

Timothy Fitz, "What webhooks are and why you should care", Feb. 9, 2009, p. 1 (Year: 2009).*
(Continued)

*Primary Examiner* — Quang N Nguyen
(74) *Attorney, Agent, or Firm* — Kilpatrick Townsend & Stockton LLP

(57) ABSTRACT

Provided are methods, systems, and computer-program products for server collaboration. For example, a method can include receiving, by a first bot server from a messaging application, a hypertext transfer protocol (HTTP) post call message associated with a session. The first bot server sends a transfer request to transfer the session to a second bot server. A timer can be set for completing the operations associated with the session by the second bot server. If the timer expires and the first bot server determines the operations have yet to be performed, the first bot server transmits another transfer request to transfer the session from the second bot server to the first bot server, whereby the first bot server then performs the operations.

20 Claims, 13 Drawing Sheets

Related U.S. Application Data

(60) Provisional application No. 62/353,002, filed on Jun. 21, 2016.

(51) Int. Cl.
*G06F 40/30* (2020.01)
*G06F 40/205* (2020.01)
*H04L 12/58* (2006.01)

(52) U.S. Cl.
CPC .............. *H04L 51/02* (2013.01); *H04L 51/04* (2013.01); *H04L 67/02* (2013.01); *H04L 51/14* (2013.01)

(56) References Cited

U.S. PATENT DOCUMENTS

| | | | |
|---|---|---|---|
| 7,464,141 B2 | 12/2008 | Morris | |
| 7,496,500 B2 | 2/2009 | Reed et al. | |
| 7,503,007 B2 | 3/2009 | Goodman et al. | |
| 7,516,208 B1 | 4/2009 | Kerrison et al. | |
| 7,738,650 B2 | 6/2010 | Balk | |
| 7,895,325 B2 | 2/2011 | Van Vleet et al. | |
| 7,996,855 B2 | 8/2011 | Heist et al. | |
| 8,238,891 B1 | 8/2012 | Tam et al. | |
| 8,583,810 B2 | 11/2013 | Turk | |
| 8,799,000 B2 | 8/2014 | Guzzoni et al. | |
| 8,898,140 B2 | 11/2014 | Cooper et al. | |
| 8,914,446 B2 | 12/2014 | Braudes | |
| 8,943,147 B2 | 1/2015 | Baartman et al. | |
| 8,948,057 B2 | 2/2015 | Ku et al. | |
| 9,196,245 B2 | 11/2015 | Larcheveque et al. | |
| 9,319,243 B2 | 4/2016 | Stewart | |
| 9,361,604 B2 | 6/2016 | Dhara et al. | |
| 9,413,590 B2 | 8/2016 | Breard et al. | |
| 10,270,864 B2 | 4/2019 | Sagar et al. | |
| 10,491,547 B2 | 11/2019 | Sagar | |
| 10,498,674 B2 | 12/2019 | Sagar | |
| 10,616,147 B2 | 4/2020 | Viswanathan et al. | |
| 2002/0138553 A1 | 9/2002 | Binder | |
| 2002/0152463 A1 | 10/2002 | Dudkiewicz | |
| 2003/0093480 A1 | 5/2003 | Lagarde et al. | |
| 2003/0126063 A1 | 7/2003 | Reuter et al. | |
| 2003/0188037 A1 | 10/2003 | Elberse | |
| 2004/0030750 A1* | 2/2004 | Moore ................ H04L 12/1403 709/204 | |
| 2005/0049995 A1 | 3/2005 | Parkinson | |
| 2005/0138132 A1 | 6/2005 | Zhou et al. | |
| 2006/0021004 A1* | 1/2006 | Moran .................... H04L 63/08 726/2 | |
| 2006/0136298 A1 | 6/2006 | Klein et al. | |
| 2007/0192474 A1 | 4/2007 | Decasper et al. | |
| 2007/0174246 A1 | 7/2007 | Sigurdsson et al. | |
| 2008/0147406 A1 | 6/2008 | da Palma et al. | |
| 2008/0165762 A1 | 7/2008 | Gilfix et al. | |
| 2008/0195712 A1* | 8/2008 | Lin ....................... G06F 3/0486 709/206 | |
| 2008/0313080 A1* | 12/2008 | Vasa ...................... G06Q 20/40 709/206 | |
| 2009/0070311 A1 | 3/2009 | Feng | |
| 2009/0234924 A1 | 9/2009 | Edelen et al. | |
| 2010/0004004 A1 | 1/2010 | Browne-Swinburne et al. | |
| 2010/0023506 A1 | 1/2010 | Sahni et al. | |
| 2010/0094655 A1 | 4/2010 | Kochendorfer et al. | |
| 2011/0046960 A1 | 2/2011 | Spier et al. | |
| 2011/0314002 A1 | 12/2011 | Oliver et al. | |
| 2012/0042078 A1* | 2/2012 | Kroeger ................. G06F 16/40 709/226 | |
| 2012/0173566 A1 | 7/2012 | D'Angelo et al. | |
| 2012/0215752 A1 | 8/2012 | Parkkinen et al. | |
| 2012/0265528 A1 | 10/2012 | Gruber et al. | |
| 2012/0296638 A1 | 11/2012 | Patwa | |
| 2013/0103686 A1 | 4/2013 | Sisneros | |
| 2013/0111572 A1 | 5/2013 | Gaddam et al. | |
| 2014/0122083 A1 | 5/2014 | Xiaojiang | |
| 2014/0122618 A1 | 5/2014 | Duan | |
| 2014/0122626 A1 | 5/2014 | Alam | |
| 2014/0337381 A1 | 5/2014 | Aravamudan et al. | |
| 2014/0236958 A1 | 8/2014 | Vaughn | |
| 2014/0310001 A1 | 10/2014 | Kalns et al. | |
| 2015/0039675 A1 | 2/2015 | Warren et al. | |
| 2015/0066479 A1 | 3/2015 | Pasupalak et al. | |
| 2015/0312176 A1 | 4/2015 | Jones et al. | |
| 2015/0169385 A1 | 6/2015 | Allen et al. | |
| 2015/0172228 A1 | 6/2015 | Zalepa et al. | |
| 2016/0029185 A1 | 1/2016 | Burke et al. | |
| 2016/0063377 A1 | 3/2016 | Allen et al. | |
| 2016/0065519 A1 | 3/2016 | Waltermann et al. | |
| 2016/0086499 A1 | 3/2016 | Liang et al. | |
| 2016/0094490 A1 | 3/2016 | Li et al. | |
| 2016/0179937 A1 | 6/2016 | Allen et al. | |
| 2016/0292276 A1 | 10/2016 | Denninghoff | |
| 2016/0294796 A1 | 10/2016 | Hidayat et al. | |
| 2017/0083507 A1 | 3/2017 | Ho et al. | |
| 2017/0289070 A1 | 10/2017 | Plumb et al. | |
| 2017/0295121 A1 | 10/2017 | Zhang et al. | |
| 2017/0338962 A1* | 11/2017 | Li ........................ H04W 8/205 | |
| 2017/0366480 A1 | 12/2017 | Sagar | |
| 2017/0366481 A1 | 12/2017 | Sagar | |
| 2017/0366621 A1 | 12/2017 | Sagar et al. | |
| 2018/0081950 A1 | 3/2018 | Mishra et al. | |
| 2018/0083892 A1 | 3/2018 | Viswanathan et al. | |
| 2018/0083893 A1 | 3/2018 | Viswanathan et al. | |
| 2018/0302437 A1 | 10/2018 | Pastore et al. | |
| 2019/0052616 A1* | 2/2019 | Campbell ............. H04L 67/306 | |

FOREIGN PATENT DOCUMENTS

| | | |
|---|---|---|
| WO | 2014089539 | 6/2014 |
| WO | 2017222615 | 12/2017 |
| WO | 2017222616 | 12/2017 |
| WO | 2017222617 | 12/2017 |
| WO | 2018052542 | 3/2018 |
| WO | 2018052543 | 3/2018 |
| WO | 2018052544 | 3/2018 |

OTHER PUBLICATIONS

U.S. Appl. No. 15/661,567, Notice of Allowance dated Sep. 23, 2019, 7 pages.
U.S. Appl. No. 15/661,607, Non-Final Office Action dated Sep. 25, 2019, 9 pages.
U.S. Appl. No. 15/661,567, Final Office Action dated May 20, 2019, 16 pages.
U.S. Appl. No. 15/462,737, Non-Final Office Action dated Mar. 8, 2019, 11 pages.
European Application No. 17717538.7, Office Action dated Mar. 27, 2020, 4 pages.
U.S. Appl. No. 15/661,607, Final Office Action dated Apr. 7, 2020, 10 pages.
"Bot Engine," retrieved from the internet: https://wit.ai/blog/2016/04/12/bot-engine, Apr. 12, 2016, 4 pages.
Edwards; Keith W., "Session Management for Collaborative Applications," Proceedings of the ACM Conference on Computer-Supported Cooperative Work, , retrieved from the internet: http://www.cc.gatech.edu/home/keith/pubs/session-mgmt.pdf, Oct. 22-26, 1994, 8 pages.
Fitz, What webhooks are and why you should care, URL:http://timothyfitz.com/2009/02/09/what-webhooks-are-and-why-you-should-care/, Feb. 9, 2009, 3 pages.
"Fugu Chatbots," retrieved from the internet: http://click-labs.com/launching-fugu-user-insights-marketing-automation-bot-apps-2/, May 9, 2016, 4 pages.
Pezzè; Alessandro. "How to deploy a Facebook bot," Meduim, retrieved from the internet: https://medium.com/@igougi.ui/how-to-deploy-a-facebook-bot-2b8c4f4e7eae#.bgzbrzwnz, May 17, 2016, 16 pages.
Quarteroni, "Advanced Techniques for Personalized, Interactive Question Answering," retrieved from the internet: https://www.cs.york.ac.uk/ftpdir/reports/2007/YCST/18/YCST-2007-18.pdf, 2007, 239 pages.

(56) References Cited

OTHER PUBLICATIONS

Roderick; Leonie, "Domino's Pizza explains why it is chasing Facebook bots," Marketing Week, retrieved from the internet: https://www.marketingweek.com/2016/08/17/dominos-pizza-explains-why-it-is-chasing-facebook-bots/, Aug. 17, 2016, 4 pages.

Rosenberg; Seth. "How to Build Bots for Messenger," facebook for developers, retrieved from the internet: https://developers.facebook.com/blog/post/2016/04/12/bots-for-messenger/, Copyright Apr. 12, 2016, 3 pages.

"Technical Issues of Establishing Any-To-Any 2-Way Real-Time Communications Over the Internet," Jul. 2004, 19 pages.

International Application No. PCT/US2017/022952, International Search Report and Written Opinion dated May 31, 2017, 13 pages.

International Application No. PCT/US2017/022952, International Preliminary Report on Patentability dated Jan. 3, 2019, 9 pages.

International Application No. PCT/US2017/022900, International Search Report and Written Opinion dated Jun. 26, 2017, 10 pages.

International Application No. PCT/US2017/022900, International Preliminary Report on Patentability, dated Jan. 3, 2019, 8 pages.

International Application No. PCT/US2017/022919, International Search Report and Written Opinion dated Jun. 27, 2017, 11 pages.

International Application No. PCT/US2017/022919, International Preliminary Report on Patentability dated Jan. 3, 2019, 8 pages.

International Application No. PCT/US2017/044110, International Search Report and Written Opinion dated Nov. 8, 2017, 13 pages.

International Application No. PCT/US2017/044110, Written Opinion dated Jul. 20, 2018, 7 pages.

International Application No. PCT/US2017/044114, International Search Report and Written Opinion dated Nov. 8, 2017, 13 pages.

International Application No. PCT/US2017/044114, International Preliminary Report on Patentability dated Nov. 28, 2018, 8 pages.

International Application No. PCT/US2017/044114, Written Opinion dated Aug. 7, 2018, 7 pages.

International Application No. PCT/US2017/044117, "International Search Report and Written Opinion" dated Dec. 11, 2017, 11 pages.

International Application No. PCT/US2017/044117, "International Preliminary Report on Patentability" dated Nov. 28, 2018, 7 pages.

International Application No. PCT/US2017/044117, Written Opinion dated Jul. 20, 2018, 6 pages.

U.S. Appl. No. 15/462,649, Notice of Allowance dated Jan. 7, 2019, 15 pages.

U.S. Appl. No. 15/661,567, Non-Final Office Action dated Nov. 19, 2018, 14 pages.

U.S. Appl. No. 15/462,729, Non-Final Office Action dated Jan. 28, 2019, 37 pages.

U.S. Appl. No. 15/661,516, Non-Final Office Action dated Jan. 14, 2019, 19 pages.

U.S. Appl. No. 15/661,516, Non-Final Office Action dated Dec. 10, 2019, 20 pages.

U.S. Appl. No. 15/661,567, Notice of Allowance dated Nov. 15, 2019, 8 pages.

U.S. Appl. No. 15/462,729, Notice of Allowance dated Jul. 25, 2019, 9 pages.

U.S. Appl. No. 15/462,737, Final Office Action dated Jun. 27, 2019, 6 pages.

U.S. Appl. No. 15/462,737, Notice of Allowance dated Jul. 29, 2019, 7 pages.

U.S. Appl. No. 15/661,516, Final Office Action dated Jul. 29, 2019, 22 pages.

U.S. Appl. No. 15/661,567, Advisory Action dated Aug. 2, 2019, 2 pages.

Chinese Application No. CN201780054868.1, Office Action dated Aug. 4, 2020, 13 pages (6 pages of Original Document and 7 pages of English Translation).

U.S. Appl. No. 15/661,607, Non-Final Office Action dated Sep. 9, 2020, 10 pages.

* cited by examiner

INTERNET CLOUD-HOSTED NATURAL LANGUAGE INTERACTIVE MESSAGING SYSTEM SERVER COLLABORATION

CROSS-REFERENCES TO RELATED APPLICATIONS

This Continuation Application claims the benefit of U.S. Nonprovisional application Ser. No. 15/462,649, filed Mar. 17, 2017 and issued as U.S. Pat. No. 10,270,864 issued on Apr. 23, 2019, entitled, "INTERNET CLOUD-HOSTED NATURAL LANGUAGE INTERACTIVE MESSAGING SYSTEM SERVER COLLABORATION," which claims the benefit under 35 U.S.C. § 119 of U.S. Provisional Application No. 62/353,002, filed on Jun. 21, 2016, entitled, "INTERNET CLOUD-HOSTED NATURAL LANGUAGE INTERACTIVE MESSAGING SYSTEM SERVER COLLABORATION," which are incorporated herein by reference in their entirety.

BACKGROUND

Messaging applications (e.g., FACEBOOK® Messenger, WHATSAPP® instant messaging software, WECHAT® mobile text and voice messaging communication service, KIK® Messenger, TELEGRAM® Messenger, SKYPE MOBILE®, and the like) are a fast emerging technology on electronic devices (e.g., computers, mobile devices, smart televisions, and the like). The messaging applications have obtained high penetration and daily usage numbers. However, enterprise applications (e.g., applications associated with businesses and/or enterprises) on mobile devices are struggling to get users to download and use the enterprise applications regularly. Therefore, there is a need for enterprises to obtain greater penetration and daily usage numbers for their content.

BRIEF SUMMARY

Provided herein are methods, systems, and computer-program products for providing a bot server to communicate with users using messaging applications. In some implementations, a method, system, and computer-program product for associating a message received by a bot server using a messaging application is provided. For example, a first method can include receiving a hypertext transfer protocol (HTTP) post call message from a messaging application server. In some examples, the HTTP post call message can be received by a bot server associated with a uniform resource identifier (URI). In such examples, the HTTP post call message can be associated with a user and be directed to the URI from the messaging application server.

The first method can further include parsing content of the HTTP post call message to identify a keyword. The first method can further include identifying an existing session from a plurality of sessions based on a context of the HTTP post call message and the keyword. In some examples, a session of the plurality of sessions represents an interaction between the user and the bot server. In some implementations, the existing session can be the session.

The first method can further include associating information from the HTTP post call message with the existing session. The first method can further include generating a response to the HTTP post call message based on the existing session.

In some implementations, the HTTP post call message can include a natural-language interaction. In some implementations, the messaging application server can be associated with at least one or more of FACEBOOK® Messenger, WHATSAPP® instant messaging software, WECHAT® mobile text and voice messaging communication service, KIK® Messenger, TELEGRAM® Messenger, and SKYPE MOBILE. In such implementations, at least a portion of the content of the HTTP post call message can be sent to the messaging application server using a messaging application on a mobile device. For example, user content, such as text, audio, or media, can be sent from the mobile device to the messaging application server. The messaging application server can then create the HTTP post call message to be sent to the bot server using the user content.

In some implementations, the HTTP post call message can be received by a connector of the bot server. In such implementations, the connector can be an interface between the messaging application server and the bot server. In such implementations, the connector can normalize messages between a plurality of messaging application servers. Normalizing can include formatting the HTTP post call message to a common format.

In some implementations, the HTTP post call message can be received by a load-balancing component of the bot server. In such implementations, the load-balancing component can send the HTTP post call message to a connector of a plurality of connectors on the bot server based on a load of the bot server.

In some implementations, the session can include information from a first HTTP post call message from a first bot server and information from a second HTTP post call message from a second bot server. In some implementations, the session can include information from a first HTTP post call message from a first messaging application and information from a second HTTP post call message from a second messaging application.

In some implementations, identifying the existing session can include determining whether the HTTP post call message is related to the existing session. In some implementations, the HTTP post call message can be included in a conversation between two or more users, wherein the conversation is facilitated by the messaging application. In such implementations, the conversation can include a first topic and a second topic. The first topic can be associated with a first session, and the second topic can be associated with a second session. In some implementations, a user of the two or more users is the bot server.

In some implementations, the context can include at least one or more of a time stamp of the HTTP post call message, enterprise data, one or more previous messages from the user, a user profile of the user, one or more user preferences of the user, previous history of one or more interactions between the user and an enterprise associated with the bot server, or any combination thereof. In some examples, the previous history can include a past purchase, a past conversation, a past action, a past query, a past application program interface (API) call, a past data request, or a past data search. In some examples, enterprise data can include information obtained by the bot server from a source unrelated to the messaging application server. In such implementations, the conversation can be between two or more users. The conversation can be facilitated by the messaging application server, and the conversation can include at least a portion of the HTTP post call message. In some implementations, the first method can further include associating information from the response to the HTTP post call message with the session.

In some implementations, a method, system, and computer-program product for associating a plurality of messages with a user is provided. For example, a second method can include receiving a first hypertext transfer protocol (HTTP) post call message. In some implementations, the first HTTP post call message can be received by a bot server associated with a uniform resource identifier (URI). The first HTTP post call message can be associated with a first user and be directed to the URI from a first messaging application server.

The second method can further include receiving a second HTTP post call message. In some implementations, the second HTTP post call message can be received by the bot server associated with the URI. The second HTTP post call message can be associated with a second user and be directed to the URI from a second messaging application server.

The second method can further include parsing content of the first HTTP post call message to identify a first keyword. The second method can further include identifying a first existing user from a plurality of users based on a context of the first HTTP post call message and the first keyword. The second method can further include associating information from the first HTTP post call message with the first existing user.

The second method can further include parsing content of the second HTTP post call message to identify a second keyword. The second method can further include identifying a second existing user for the second HTTP post call message from a plurality of users based on a context of the second HTTP post call message and the second keyword. In some examples, the second existing user can be the first existing user.

The second method can further include associating information from the second HTTP post call message with the first existing user. The second method can further include responding to the second HTTP post call message based on information from at least one or more of the first HTTP post call message, the second HTTP post call message, and the first existing user.

In some implementations, an identification of the first user can be different than an identification of the second user. The response to the second HTTP post call message can be sent to the user using the first messaging application server.

The second method can further include associating the first existing user with an enterprise account. The enterprise account can be separate from a messaging application server. In some implementations, each of the first messaging application server and the second messaging application server can be associated with one of FACEBOOK® Messenger, WHATSAPP® instant messaging software, WECHAT® mobile text and voice messaging communication service, KIK® Messenger, TELEGRAM® Messenger, and SKYPE MOBILE®. In some examples, at least a portion of the content of the first HTTP post call message can be sent to the first messaging application server from a first mobile device, and at least a portion of the content of the second message can be sent to the second messaging application server from a second mobile device. The first mobile device can be the same as or different from the second mobile device.

In some implementations, the first HTTP post call message and the second HTTP post call message can each include a natural-language interaction. In some implementations, information from at least one or more of the first HTTP post call message, the second HTTP post call message, the first messaging application server, the second messaging application server, the first user, the second user, or any combination thereof can be associated with a session.

In some implementations, a method, system, and computer-program product for server collaboration is provided. For example, a third method can include receiving a hypertext transfer protocol (HTTP) post call message. The HTTP post call message can be received by a first bot server. In some implementations, the first bot server can include a first uniform resource identifier (URI). The HTTP post call message can be associated with a user and be directed to the URI from a first messaging application server. Information from the HTTP post call message can be associated with a session.

The third method can further include determining to transfer the session to a second bot server based on the HTTP post message. The determination can be made by the first bot server. In some implementations, the second bot server can include a second URI.

The third method can further include sending a transfer request by the first bot server. In some implementations, the transfer request can be directed to the second bot server. The transfer request can cause the session to be unassociated with the first bot server and associated with the second bot server. In some implementations, information associated with the first bot server can be saved separately in the session from information associated with the second bot server.

The third method can further include receiving a return request by the first bot server. The return request can cause the session to be unassociated with the second bot server and associated with the first bot server. In some implementations, the return request can be sent from the second bot server to the first bot server after the second bot server is finished with the session or after an amount of time has passed since the transfer request was sent.

In some examples, the HTTP post call message can include a natural-language interaction. In some implementations, the messaging application server can be associated with one of FACEBOOK® Messenger, WHATSAPP® instant messaging software, WECHAT® mobile text and voice messaging communication service, KIK® Messenger, TELEGRAM® Messenger, and SKYPE MOBILE®. In such implementations, at least a portion of content of the HTTP post call message can be sent to the messaging application server from a mobile device.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative examples are described in detail below with reference to the following figures.

DETAILED DESCRIPTION

Figure 1:
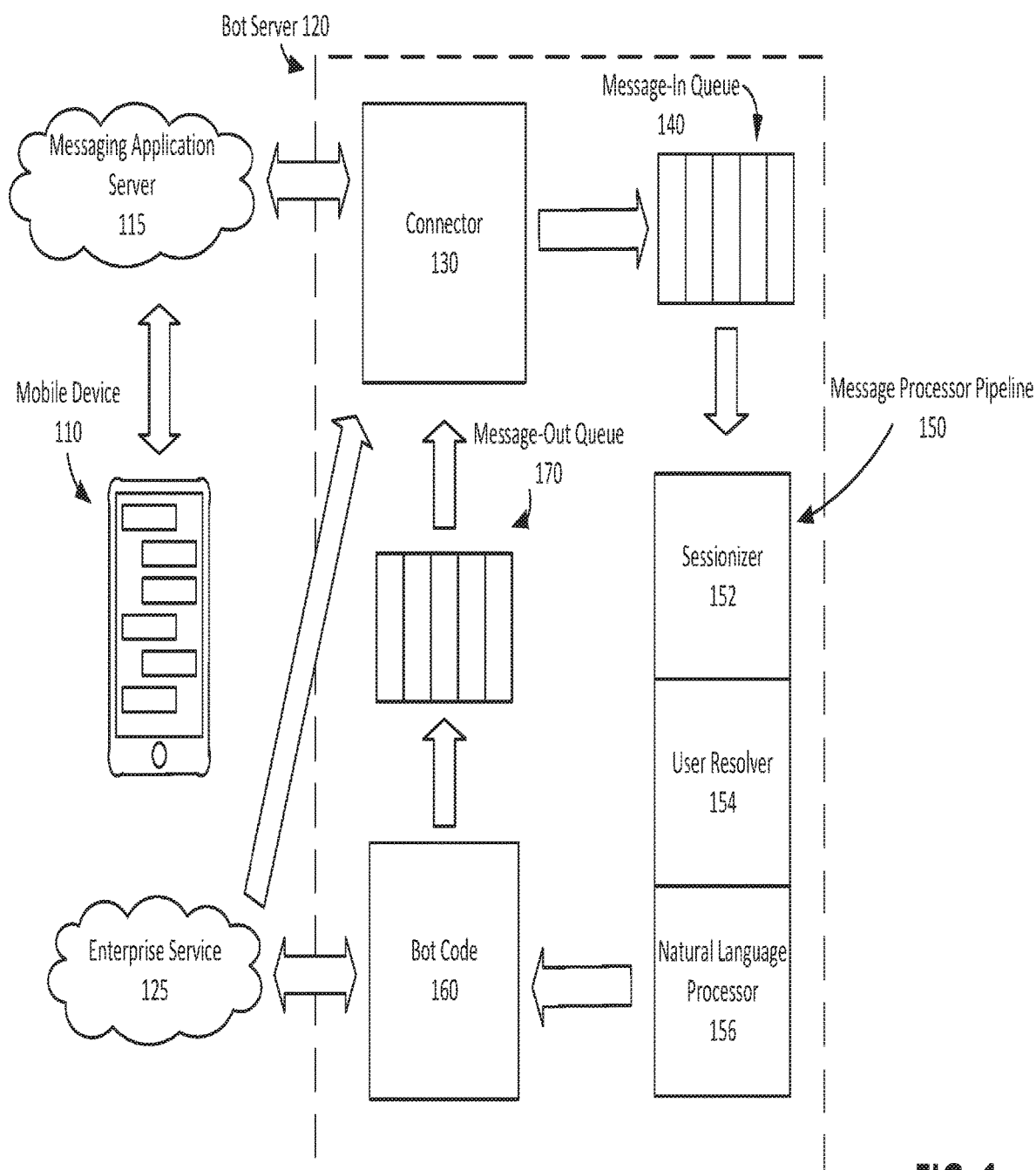
FIG. 1 illustrates an example of a system that implements a bot server for communicating with a user using a messaging application.

In the following description, for the purposes of explanation, specific details are set forth in order to provide a thorough understanding of examples of this disclosure. However, it will be apparent that various examples may be practiced without these specific details. The figures and description are not intended to be restrictive.

The ensuing description examples only, and is not intended to limit the scope, applicability, or configuration of the disclosure. Rather, the ensuing description of the examples will provide those skilled in the art with an enabling description for implementing an example of this disclosure. It should be understood that various changes may be made in the function and arrangement of elements without departing from the spirit and scope of this disclosure as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

A. Overview

Examples herein relate to a bot server that can respond to natural-language questions and/or comments through a messaging application using natural-language messages. In particular, examples can allow enterprises to define one or more bot servers that communicate with users and run the one or more bot servers at scale in a multi-tenant, cross-messaging platform manner. In some examples, the one or more bot servers can initiate communications with users.

In some examples, a bot server can be associated with a Uniform Resource Identifier (URI) (e.g., a Uniform Resource Locator (URL) and Uniform Resource Name (URN)). The URI can identify the bot server using a string of characters. In some examples, the URI can be used as a webhook (e.g., an HTTP callback such as an HTTP post call message) for one or more messaging application servers. In some examples, a messaging application server can sent a message to a bot server when one or more events occur using a webhook. The webhook can serve as a way for the bot server to receive information when it happens, rather than continually polling for the information.

In some examples, the bot server can be designed to receive a message (e.g., a hypertext transfer protocol (HTTP) post call message) from a messaging application server. The HTTP post call message can be directed to the URI from the messaging application server. In some examples, the message can be different from a HTTP post call message. For example, the bot server can receive a message from a Short Message Server (SMS). While discussion herein will refer to data that the bot server receives as a message, a person of ordinary skill in the art will recognize that the message can be an HTTP post call message, a SMS message, or any other type of message from a messaging platform. In addition, anytime a bot server sends a message from one component to another, a person of ordinary skill in the art will recognize that the actual message might not be sent. Instead, information from the message or a pointer to a memory location of the message can be sent.

In some examples, a bot server can automatically handle one or more user interactions. For example, a user can send one or more messages to a bot server in order to achieve a desired goal. A message can include a message in natural language (e.g., text, emojis, voice, or other method of conveying a message). The bot server can convert the message into a standardized form (e.g., a REST call against the enterprise services with the proper parameters) and generate a natural language response. The bot server can also prompt the user for additional required parameters and request additional information. In some examples, the bot server can also initiate a communication with the user.

FIG. 1 illustrates an example of a system that implements a bot server 120 for communicating with a user using a messaging application. In some examples, the messaging application can be installed on an electronic device (e.g., a desktop computer, a laptop, a mobile device 110). While the discussion herein will reference a mobile device and a messaging application, a person of ordinary skill in the art will recognize that any electronic device can be used and any messaging platform can be used (e.g., FACEBOOK® Messenger, WHATSAPP® instant messaging software, WECHAT® mobile text and voice messaging communication service, KIK® Messenger, TELEGRAM® Messenger, SKYPE MOBILE®, Short Message Service (SMS)). In other examples, the messaging application can be running through a browser (e.g., GOOGLE CHROME®, MOZILLA® FIREFOX®, and INTERNET EXPLORER) that is installed on the mobile device 110. The messaging application can be FACEBOOK® Messenger, WHATSAPP® instant messaging software, WECHAT® mobile text and voice messaging communication service, KIK® Messenger, TELEGRAM® Messenger, SKYPE MOBILE®, or any other messaging application that provides a platform for users to communicate. The messaging application can be associated with a messaging application server 115. In some examples, the mobile device 110 can be connected to the messaging application server 115 by a first network (e.g., Internet or other method of connecting one device with another). The messaging application server 115 can manage content sent and received through the messaging application across multiple mobile devices. The content can include text, emojis, voice, media (e.g., a picture, a video, a link), or other method of conveying a message. In some examples, a normal message received by the bot server 120 from FACEBOOK® Messenger can be:

```
{
    "channel": {
        "tenant_id": "DemoTenant",
        "client_data": {
            "channel_user_id": "1103645260000000",
            "type": "facebook",
            "chat_id": "1103645260000000"
        },
        "type": "facebook",
        "bot_id": "DemoBot",
        "client_id": "facebook"
    },
    "id": "411fc848-350b-47de-89c3-a0ecee314401",
    "text": "Can I have a cheese pizza?",
    "type": "text"
}
```

In some examples, the messaging application server 115 can also communicate with the bot server 120. The communication between the messaging application server 115 and the bot server 120 can use a second network (e.g., Internet or other method of connecting one device with another). The first network and the second network can be the same network, or they can be similar or completely different networks. The messaging application server 115 can route content (e.g., a message, information from a message, or a pointer to a memory location of the message) from the mobile device 110 to the bot server 120 using the Internet. The destination of the content (e.g., an identification of the bot server 120) can be included in the content as a nominal addressee.

The bot server 120 can receive the content using a connector 130. The connector 130 can act as an interface between the messaging application server 115 and the bot server 120. In some examples, the connector 120 can normalize content from the messaging application server 115 such that the bot server 120 can analyze content across different messaging application servers. Normalizing can include formatting content from each type of messaging application to a common format for processing. In some examples, the bot server 120 can include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE®, a Short Message Service (SMS)), as will be described in FIG. 2.

The connector 130 can route the content to a message-in queue 140. In some examples, the message-in queue 140 can store content in an order received. In other examples, the message-in queue 140 can store content based on a priority assigned to each method. In such examples, the priority can be based on at least one or more of the content, a time stamp of the content, information associated with a user that sent the content, or any other information regarding the content or the bot server (e.g., a load of the bot server in comparison to an estimated processing amount for the content). In some examples, the connector 130 can be associated with one or more message-in queues, as will be described in FIG. 2.

The message-in queue 140 can send the content to a message processor pipeline 150 when the message processor pipeline 150 becomes available. In some examples, the message processor pipeline 150 can analyze the content using one or more of the innovations described herein. For example, the message processor pipeline 150 can include at least one or more of a sessionizer 152, a user resolver 154, a natural language processor 156, or any combination thereof. Generally, the sessionizer 152 can create and manage sessions for users and bot servers. Generally, the user resolver 154 can determine sessions that can be combined because of a user using multiple messaging applications. Generally, the natural language processor 156 can parse a message to determine an intent or a session for the message. The intent can include a purpose of the message. For example, a purpose of the message can be to order a pizza, order a computer, ask a question regarding delivery, or the like.

After the content is analyzed by the message processor pipeline 150, the analyzed content can be sent to bot code 160. The bot code 160 can be written by a third party (e.g., an enterprise that the bot server is associated) to determine an action to perform based on the analyzed content and a session. In some examples, the bot code 160 can send outbound content to a message-out queue 170. The message-out queue 170 can send the outbound content to the connector 130. The connector 130 can then send the outbound content to the messaging application server indicated by the bot code 160. The messaging application server 115 can then forward the outbound content to the messaging application on the mobile device 115.

The bot server 120 can further communicate with one or more enterprise services (e.g., enterprise service 125), a knowledge graph server (not shown), or other content sources (e.g., a remote database, a remote device, or the like). The enterprise service 125 can communicate with at least one or more of the connector 130, the bot code 160, or any combination thereof. The enterprise service 125 can communicate with the connector 130 in a similar manner to the messaging application server 115. The enterprise service 125 can send content to the connector 130 to be associated with one or more users. The enterprise service 125 can also send content to the connector 130 to cause the bot server 120 to perform an action associated with a user. The bot code 160 can communicate with the enterprise service 125 to obtain information from the enterprise service 125 and/or for the enterprise service 125 to take an action identified by the bot code 160.

In some examples, the bot server 120 can include one or more timers. A timer can cause the bot code 160 to send content to a user by the connector 130 using the messaging application server 115 after an amount of time lapses. The content can arrive to the user on a messaging application installed on a device of the user. In some examples, a timer can send content to the bot server 120 similar to a user or an enterprise service 125. For example, the timer can send a message to the bot server 120 to be analyzed as a message from a user would be analyzed.

To illustrate a communication process of the bot server 120, an example will now be described. A user can send a message to a messaging application server using a messaging application on a device of a user. The messaging application server can parse the message to identify an account associated with the messaging application server to send the message. The messaging application server can identify a bot server as the account. The messaging application server can then send the message to the bot server. In some examples, the messaging application server can repackage the message into a different format to send to the bot server (e.g., a HTTP post call message). The message can include a greeting. The bot server can identify that a new conversation has begun with the user. The bot server can identify one or more characteristics of the user. For example, the bot server can identify a name of the user using a profile associated with the user on the messaging application server. Using the one or more characteristics, the bot server can respond to the user on the messaging application. The response can include a personal message to the user that responds to the message received from the user. For example, the response can include a greeting using the name of the user.

Depending on an enterprise associated with the bot server, the bot server can progress to accomplish a goal of the enterprise. For example, if the bot server is associated with a pizza delivery enterprise, the bot server can facilitate a pizza purchase. The conversation between the bot server and the user can continue, going back and forth, until the bot server has completed the conversation or the user stops responding to the bot server.

In some examples, the bot server can initiate a conversation with a user. The bot server-initiated conversation can be in response to a previous conversation with the user. For example, the user can order a pizza in the previous conversation. The bot server can then initiate a conversation when the pizza is ready. In some examples, the bot server can determine the pizza is ready when an indication is received from the enterprise associated with the bot server (e.g., an employee sending a message to the bot server that the pizza is ready). The conversation can include a message sent to the user that indicates that the pizza is ready. For another examples, the bot server can initiate a conversation after a certain amount has passed since a previous conversation.

In some examples, the bot server can send a message to the user on a different messaging application than the messaging application that a previous message was received. For example, the bot server can determine to send the message using Short Message Service (SMS) rather than FACEBOOK® Messenger. In such implementations, the bot server can integrate multiple messaging applications.

In some examples, the bot server can determine to start a conversation based on a timer. For example, the bot server can determine that a week after the last pizza was purchased through a messaging application that the bot server should ask the user whether the user wants another pizza. The timer can be configured by the enterprise and implemented by the bot server.

In some examples, the bot server can maintain information of the user between conversations. The information can be used so that the bot server does not need to ask some questions every time a new conversation is started between the user and the bot server. For example, the bot server can store a previous order of pizza by the user. In a new conversation, the bot server can send a message to the user that asks if the user wants the same order as last time.

Figure 2:
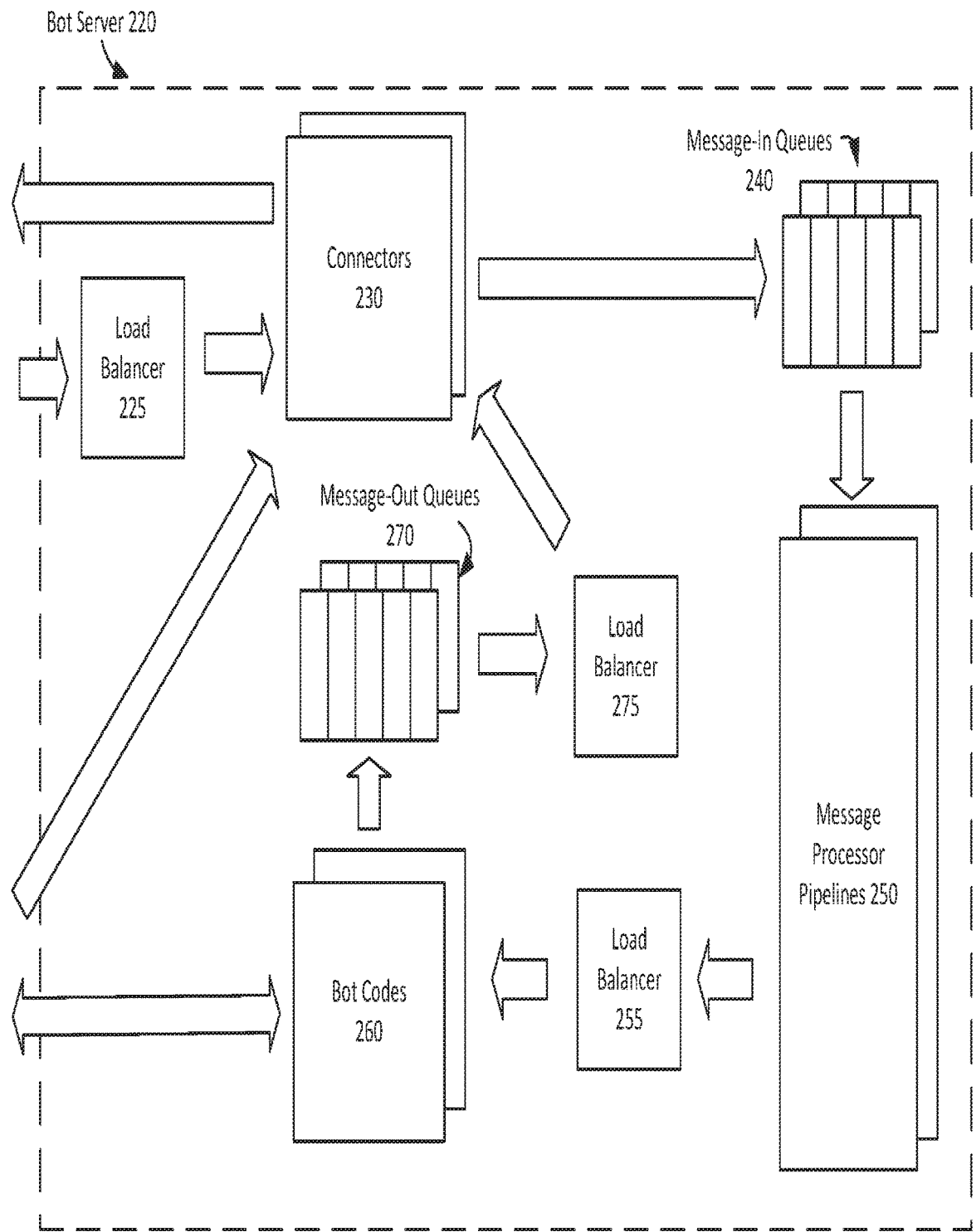
FIG. 2 illustrates an example of a bot server that is scalable for communicating with users using one or more messaging applications.

FIG. 2 illustrates an example of a bot server 220 that is scalable for communicating with users using one or more messaging applications. The bot server 220 can include multiple instances of many of the components discussed in FIG. 1. For example, the bot server 220 can receive content from a messaging application server. However, rather than receiving the content at a connector, the content can be received at a first load balancer 225. The first load balancer 225 can intelligently route the content to one or more connectors 230 to improve efficiency of the bot server 220. The first load balancer 225 can determine a connector to send a message to by hashing one or more attributes of the message. For example, an identification of a user and a length of a message can be hashed.

In some examples, at least one of the one or more connectors 230 can be associated to each messaging application server. In some examples, different messaging application servers can be associated with a different number of connectors depending on a typical, or current, load on the bot server 220 from each messaging application server.

The one or more connectors 230 can divide the content received by the bot server 220 between one or more message-in queues 240. A queuing system, such as Apache Kafka, can be used to manage the one or more message-in queues 240. Each enterprise, or user, can be associated with at least one of the one or more message-in queues 240.

In some examples, a message-in queue of the one or more message-in queues 240 can be determined based on one or more properties identified in an incoming message from a user. For example, an incoming message from a particular user or conversation can be put into the same message-in queue.

In some examples, a message-in queue can send content to one or more message processor pipelines 250. In some examples, each of the one or more message processor pipelines can be a virtual machine. In such examples, additional virtual machines can be added depending on a load of the one or more message process pipelines 250.

In some examples, the one or more message process pipelines 250 can send analyzed content to a second load balancer 255. The second load balancer 255 can divide the analyzed content between one or more instances of bot code 260. The one or more instances of bot code 260 can send one or more outbound messages to one or more message-out queues 270. In some examples, a number of the one or more message-out queues 270 can correspond to a number of the one or more instances of bot code 260. In other examples, the one or more message-out queues 270 can correspond to a load of messages being sent from the bot code 260. The one or more message-out queues 270 can incrementally send the one or more outbound messages to a third load balancer 275. The third load balancer 275 can intelligently route the one or more outbound messages to the one or more connectors 230, which can send the one or more outbound messages to the messaging application server. Similar to FIG. 1, the one or more connectors 230 and the one or more instances of bot code 260 can communicate with one or more enterprise services.

The bot server 220 can allow each component of the bot server 220 to be scaled when slowdowns with processing and sending messages by the bot server 220 are identified. For example, if the bot server 220 identifies that a number of messages are arriving at the connectors 230 that exceed a threshold (e.g., the threshold indicating a number of messages that a current configuration of the bot server 220 can handle efficiently), an additional one or more connectors can be added to the connectors 230. In addition, a number of message-in queues, message processor pipelines, instances of bot codes, message-out queues, or any combination thereof can be increased depending on whether and/or where a slowdown is identified. In such implementations, additional components (e.g., a connector) can be added without having to add other additional components (e.g., a message-in queue). For example, a connector can be added without having to add an additional instance of bot code. In some implementations, one or more components, or a portion of a component, of the bot server 220 can be run on a virtual machine. By running on a virtual machine, additional virtual machines can be initiated at will.

In some examples, the bot server 220 can store information associated with users in a cache. The cache can write to a long-term memory (e.g., non-volatile memory such as a database, read-only memory, flash memory, hard disk drives, floppy disks, magnetic tape, optical discs, or the like) to save the information after an outbound message is sent to the messaging application server from the connectors 230. In other examples, the cache can write to the long-term memory at different times (e.g., after a particular component, after each component, after an amount of time, or any other metric to determine when to write to the long-term memory).

It should be appreciated in this disclosure that any time it is described that a bot server performs an action, the action can be performed by a managing server that controls sessions for bot servers and between bot servers.

B. Sessionizer

As described above, the message processor pipeline 150 can include the sessionizer 152. The sessionizer 152 can associate a message received by the bot server 120 with a session and manage the session. In some examples, a message might not be associated with the session; instead, either a portion of the message, a pointer to a memory location of the message, or information from the message can be associated with the session. In some examples, associating a message with a session can mean to include a portion of the message or information from the message in an object (or other data structure) that represents a session. The session can include one or more messages (or information from the one or more messages) that represent an interaction between one or more users and one or more bot servers. The session can be an object, created by the sessionizer 152 that is stored in volatile and/or non-volatile memory associated with the bot server 152.

In some examples, associating a message with a session can include determining a beginning of a session, whether a message should be included in the session, and an end of a session. For example, a conversation can discuss multiple topics, each topic representing a different session. In such an example, the sessionizer 152 can determine one or more messages that are associated with each session, even if the one or more messages are interleaved in a single communication. The determining can occur even when a message does not include a subject. The determining can be based on content of a message and context of the message.

The message content can include data that is included with a message. For example, the message content can include at least one or more of an identification of a bot server, an identification of a messaging application, an identification of a user on the messaging application server, a type of the messaging application, an identification of a window in the messaging application, an identification of the message, content in the message, a type of content in the message, or any other information discussed herein relating to content of a message. In some examples, the content in the message can be in the body of the message, and include at least one or more of text, emojis, voice, media (e.g., a picture, a video, a link), or any other combination thereof. In some examples, the content can be analyzed to determine a topic of the message.

The message context can include at least one or more of a time stamp of the HTTP post call message, enterprise data (e.g., information known to an enterprise), one or more previous messages from the user, a user profile of the user, one or more user preferences of the user, previous history of one or more interactions between the user and an enterprise associated with the bot server, or any combination thereof. In some examples, the previous history can include a past purchase, a past conversation, a past action, a past query, a past application program interface (API) call, a past data request, or a past data search. In some examples, enterprise data can include information obtained by the bot server from a source unrelated to the messaging application server. In some examples, a difference in a time stamp from a first message and a time stamp from a second message can exceed a threshold, indicating that the first message and the second message are associated with different sessions. The enterprise data can include content that is not directly included in the content of a message. For example, the enterprise data can include information identified by a bot server outside of the message. In some examples, portions of a message can be associated with a session.

Once a session is created, the sessionizer 152 can maintain the session as new messages are received by the bot server 120. For example, the sessionizer 152 can add information to the session from a new message that is determined to be associated with the session. In some examples, information associated with responding to a message can also be added to the session.

In some examples, one or more sessions can be identified based on a context of the message. Once one or more sessions are identified, content of the message can be parsed to identify a keyword. The keyword can then be matched to a word in one of the one or more sessions to determine a matching session. If there is not a match, a new session can be created for the message. In other examples, content of a message can be parsed to identify a keyword. The keyword can be used to identify one or more sessions that are similar. Then, a session of the one or more sessions can be matched to the message based on a context of the message.

Figure 3:
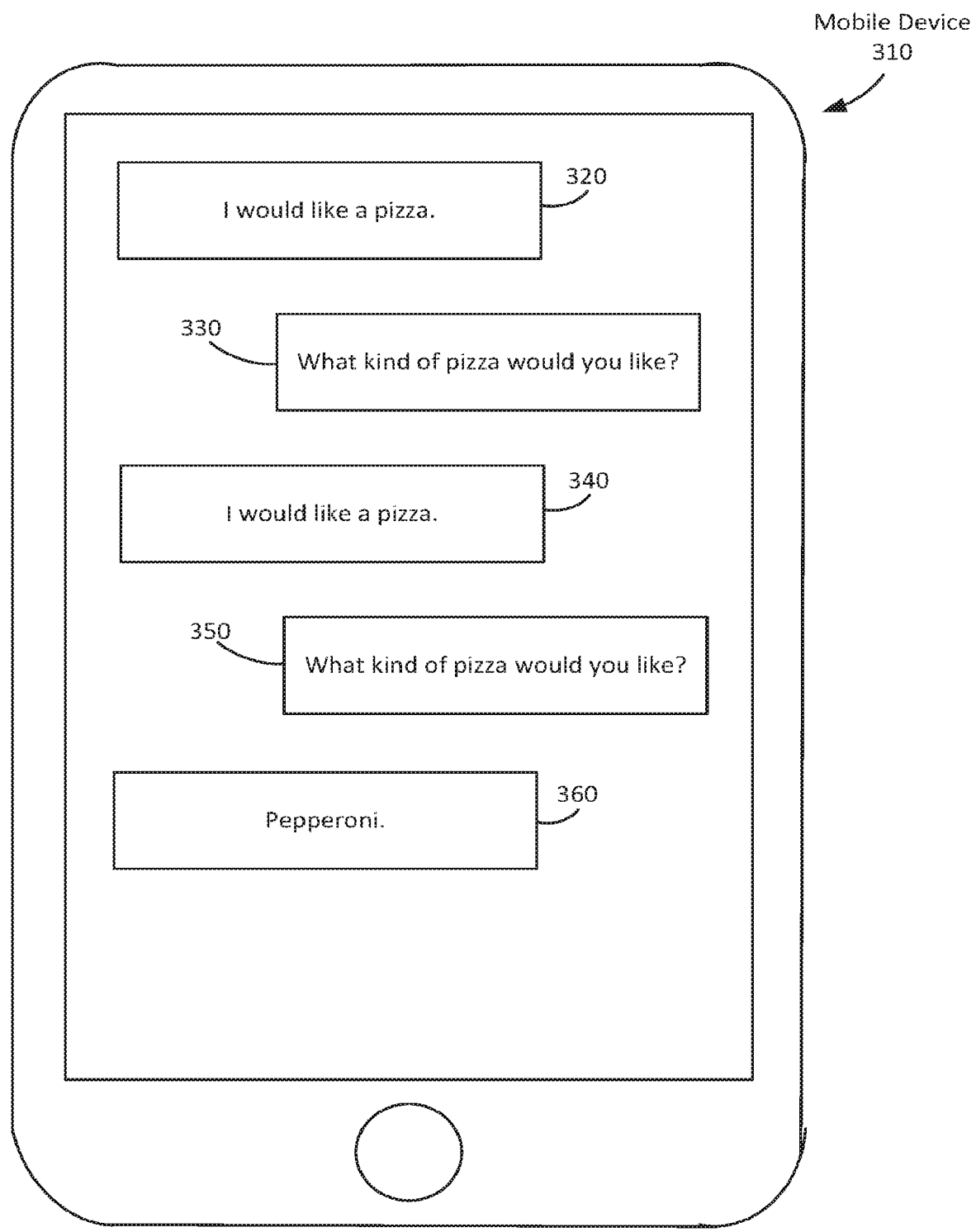
FIG. 3 illustrates an example of a conversation with multiple sessions between a user on a mobile device and a bot server.

FIG. 3 illustrates an example of a conversation with multiple sessions between a user on a mobile device 310 and a bot server. In some examples, the conversation can be facilitated by a messaging application server (e.g., the mobile device 310 can include a messaging application associated with the messaging application server). The messages on the left (e.g., messages 320, 340, 360) can be from the user, and messages on the right (e.g., messages 330, 350) can be from the bot server. For example, the user can send the first message 320 to the messaging application server using a messaging application installed on the mobile device 310. The first message 320 can include the words "I would like a pizza."

As mentioned above, the first message 320 can arrive at a connector or a load-balancer of the bot server, depending on a setup of the bot server. The first message 320 can be put into a message-in queue and, eventually, sent to a messenger processor pipeline. In the messenger processor pipeline, the first message 320 can be analyzed by a natural language processor. The first message 320 can be put into a session based on content of the first message 320 and a context of the message 320. Because this is a first message between the user and the bot server, the first message 320 can have a session created for it. The session can store information related to the user, the content of the message, and any other information associated with the first message 320 that is accessible by the bot server. The first message and/or the session can be sent to bot code to determine a response.

The response can include the words in the second message 330: "What kind of pizza would you like?" The second message 330 can be sent from the bot code to a message-out queue and, eventually, sent to the connector to be sent back to the messaging application installed on the mobile device 310 using the messaging application server. The messaging application installed on the mobile device 310 can receive the second message 330 and display the second message 330 as shown in FIG. 3. Information from the second message 330 can be saved in the session.

After receiving the second message 330, the user can send the third message 340 to the bot server using the messaging application on the mobile device 310. The third message 340 can include the words "I would like a pizza." The bot server, using the sessionizer, can determine that the third message 340 is a new session based on the content of the third message and the context of the third message. For example, time could have elapsed from the user receiving the second message 330 and the user sending the third message 340. In another example, the sessionizer can determine that the third message 340 is not a response to the second message 330. In either example, the sessionizer can create a new session for the third message 340. The bot server can respond to the third message 340 similarly to the first message 320 (e.g., by sending the fourth message 350, which asks what kind of pizza the user would like).

The user can respond to the fourth message 350 with the fifth message 360, which includes a kind of pizza the user would like. The bot server can receive the fifth message 360 as described above. However, rather than creating a new session for the fifth message 360, the sessionizer can determine that the fifth message 360 is a part of a conversation that includes the third message 340 and the fourth message 350. By the bot server grouping the three messages together, the bot code of the bot server can determine how to respond to the fifth message 360 by analyzing the third, fourth, and fifth messages together. In some examples, a response can be a message sent to an enterprise associated with the bot server to notify the enterprise that the user wants a pepperoni pizza.

Figure 4:
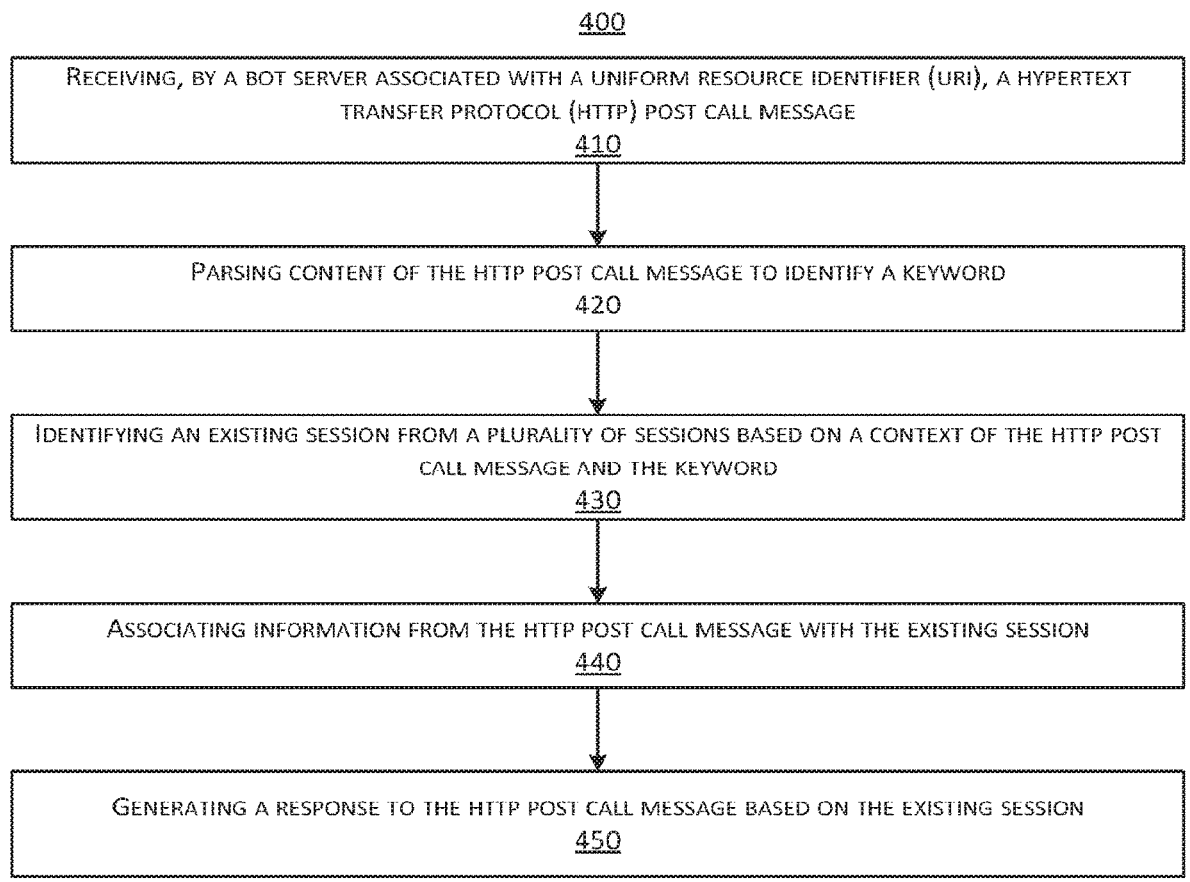
FIG. 4 is a flowchart illustrating an example of a process for associating a message with a session.

FIG. 4 is a flowchart illustrating an example of process 400 for associating a message with a session. In some aspects, the process 400 can be performed by a bot server. While specific examples might be given of a bot server, one of ordinary skill in the art will appreciate that other devices can be included in the process 400.

The process 400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 410, the process 400 includes receiving a hypertext transfer protocol (HTTP) post call message. In some examples, the HTTP post call message can be received by a bot server associated with a uniform resource identifier (URI). The HTTP post call message can be associated with a user and be directed to the URI from a messaging application server. The messaging application server can be associated with one of FACEBOOK® Messenger, WHATSAPP® instant messaging software, WECHAT® mobile text and voice messaging communication service, KIK® Messenger, TELEGRAM® Messenger, and SKYPE MOBILE®. At least a portion of the content of the HTTP post call message can be sent to the messaging application server from a mobile device. In some examples, the HTTP post call message can include a natural-language interaction. In some examples, the HTTP post call message can be associated with a conversation between two or more users (e.g., at least one user and the bot server). The conversation can be facilitated by the messaging application server. In such examples, the conversation can include a first topic and a second topic. The first topic can be associated with a first session, and the second topic can be associated with a second session.

In some examples, the HTTP post call message can be received by a connector of the bot server. The connector can be an interface between the messaging application server and the bot server. In some examples, the connector can normalize messages between a plurality of messaging application servers. In such examples, normalizing can include formatting the HTTP post call message from the messaging application server (or content included in the HTTP post call message) to a common format. In other examples, the HTTP post call message can be received by a load-balancing component of the bot server. The load-balancing component can send the HTTP post call message to a connector of a plurality of connectors based on a load of the bot server. The bot server can include the plurality of connectors.

At step 420, the process 400 further includes parsing content of the message to identify a keyword. At step 430, the process 400 further includes identifying an existing session from a plurality of sessions based on a context of the message and the keyword. In some examples, a session of the plurality of sessions can represent an interaction between the user and the bot server. The session can include information from a first HTTP post call message from a first bot server and information from a second HTTP post call message from a second bot server. In some examples, the session can include information from a first HTTP post call message from a first messaging application server and information from a second HTTP post call message from a second messaging application server.

The context can include at least one or more of a time stamp of the HTTP post call message, enterprise data, one or more previous messages from the user, a user profile of the user, one or more user preferences of the user, previous history of one or more interactions between the user and an enterprise associated with the bot server, or any combination thereof. In some examples, the previous history can include a past purchase, a past conversation, a past action, a past query, a past application program interface (API) call, a past data request, or a past data search. In some examples, enterprise data can include information obtained by the bot server from a source unrelated to the messaging application server. The enterprise data can include content that is not included in the HTTP post call message. A time stamp can be associated with when at least a portion of information in a HTTP message was received by a messaging application, a messaging application server, or a bot server. In some examples, the existing session is the session.

At step 440, the process 400 further includes associating information from the HTTP post call message with the existing session. In some examples, associating the HTTP post call message with the existing session can include at least one or more of determining a beginning of the session and whether the HTTP post call message is related to the existing session.

At step 450, the process 400 further includes generating a response to the HTTP post call message based on the existing session. In some examples, the process 400 can further include associating information from the response to the HTTP post call message with the session.

C. User Resolver

As described above, the message processor pipeline can also include the user resolver 154. The user resolver 154 can associate a message received by the bot server 120 with a user across different messaging application servers. In some examples, the user resolver 154 can determine that at least a first message received by the bot server 120 from a first messaging application server and at least a second message received by the bot server 120 from a second messaging application server are both associated with the same user, account, and/or session. In such examples, an identifier (e.g., user id) associated with a sender of each message can be different even though the messages are associated with the same user, account, and/or session. The user resolver 154 can determine the association and link the messages, users, accounts, and/or sessions.

In some examples, the session maintained by the sessionizer 152 can include a reference to one or more accounts of messaging application servers that are associated with the same user. In such examples, the bot server 120 can receive a message from a first messaging application server. The bot server 120 can respond to the message using a second messaging application server. When a message is sent on a different messaging application, the message can be formatted to fit the different messaging application. In some examples, the message can utilize options that are unique to the different messaging application. For example, the message can use a widget that the different messaging application provides.

In some examples, the user resolver 154 can link one or more messages with a known enterprise account. For example, an enterprise account can include a bank account, a utilities account, or other account that is associated with a non-messaging application. In such an example, the user resolver can link the non-messaging account with the messaging account similarly as described above. For example, a bot server of a bank can facilitate transactions between a user and the bank. The user can communicate with the server of the bank from a messaging application, such as FACEBOOK® Messenger, WHATSAPP® instant messaging software, WECHAT® mobile text and voice messaging communication service, KIK® Messenger, TELEGRAM® Messenger, or SKYPE MOBILE®. The user can confirm an identity of the user through one or more authentication questions. Once linked, the user can communicate with the bot server using the messaging application as if they were communicating with the bank directly.

Figure 5:
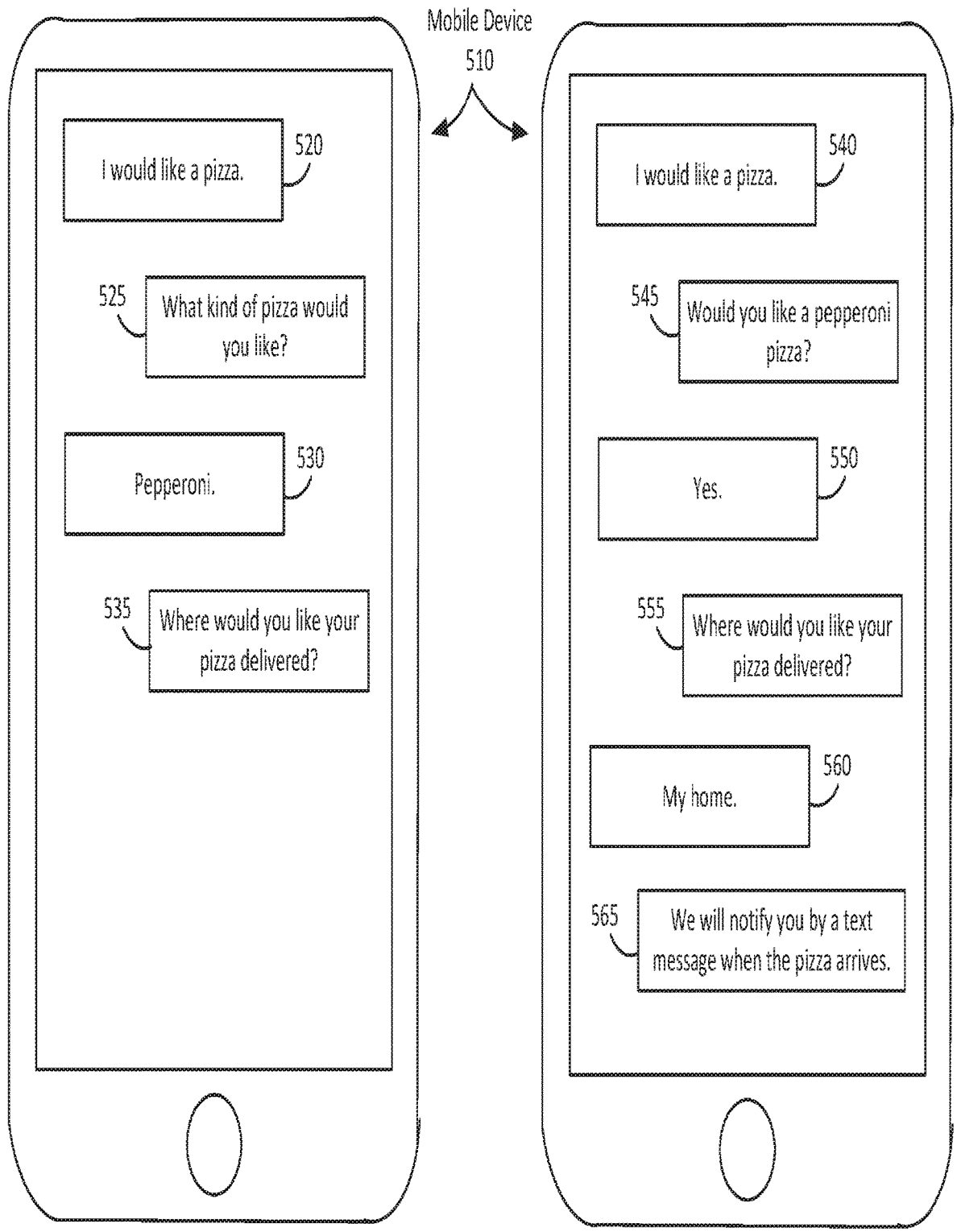
FIG. 5A illustrates an example of a first conversation between a bot server and a user using a first messaging application.
FIG. 5B illustrates an example of a second conversation between a bot server and a user using a second messaging application.

FIG. 5A illustrates an example of a first conversation between a bot server and a user using a first messaging application installed on a mobile device 510. The conversation can begin with the user sending a first message 520 to the bot server using the first messaging application. The first message 520 can include "I would like a pizza." The first message 520 can be sent through a first messaging application server, which is associated with the first messaging application, to the bot server.

The bot server, using the bot code, can respond to the first message 520 with a second message 525, which can include "What kind of pizza would you like?" The user can respond to the second message 525 with a third message 530, which can include "Pepperoni." The bot server, using the bot code, can respond to the third message 530 with a fourth message 535 asking the user "Where would you like your pizza delivered?" The first, second, third, and fourth messages can all be included in a session by the sessionizer of the bot server.

FIG. 5B illustrates an example of a second conversation between a bot server and a user using a second messaging application installed on the mobile device 510. The second conversation can occur after the first conversation, as described in FIG. 5A. The second conversation can again begin with the user telling the bot server "I would like a pizza." in a first message 540.

The bot server can determine that the user associated with the second messaging application server is the same user that is associated with the first messaging application server. The determination can include comparing an identification of the user associated with the first messaging application server and an identification of the user associated with the second messaging application server. The determination can also include detecting a mobile device that the first messaging application and the second messaging application are installed on. The determination can also include a pre-identified link of the user associated with the first messaging application server and the user associated with the second messaging application server.

After the users are linked, the session information associated with the two users can be included in a single session. For example, a session from the first conversation can be combined with the second conversation. In some examples, a link between users can be determined after two or more messages are received from a particular messaging application server. In such examples, the users can still be linked, and the sessions combined. In some examples, the bot server can send a message to the user on the second messaging application to ask whether the user associated with the first messaging application is the same user that is associated with the second messaging application.

Once the users, accounts, and/or sessions are linked, the bot server can use information associated with a first messaging application server for a conversation using a second messaging application server. For example, rather than the bot server responding again with a generic question asking about pizza, as was done in the second message 525, the bot server can respond with a personalized message to the user, such as a second message 545 which includes "Would you like a pepperoni pizza?" The second question 545 can include the additional information of pepperoni because of the session created from the first conversation in FIG. 5A. The bot server can save the information that the user has requested a pepperoni pizza before.

The second conversation can continue with messages 550, 555, 560, 565. The messages 550, 555, 560, 565 can complete the second conversation, and a session created for the second conversation, between the user and the bot server.

Figure 6:
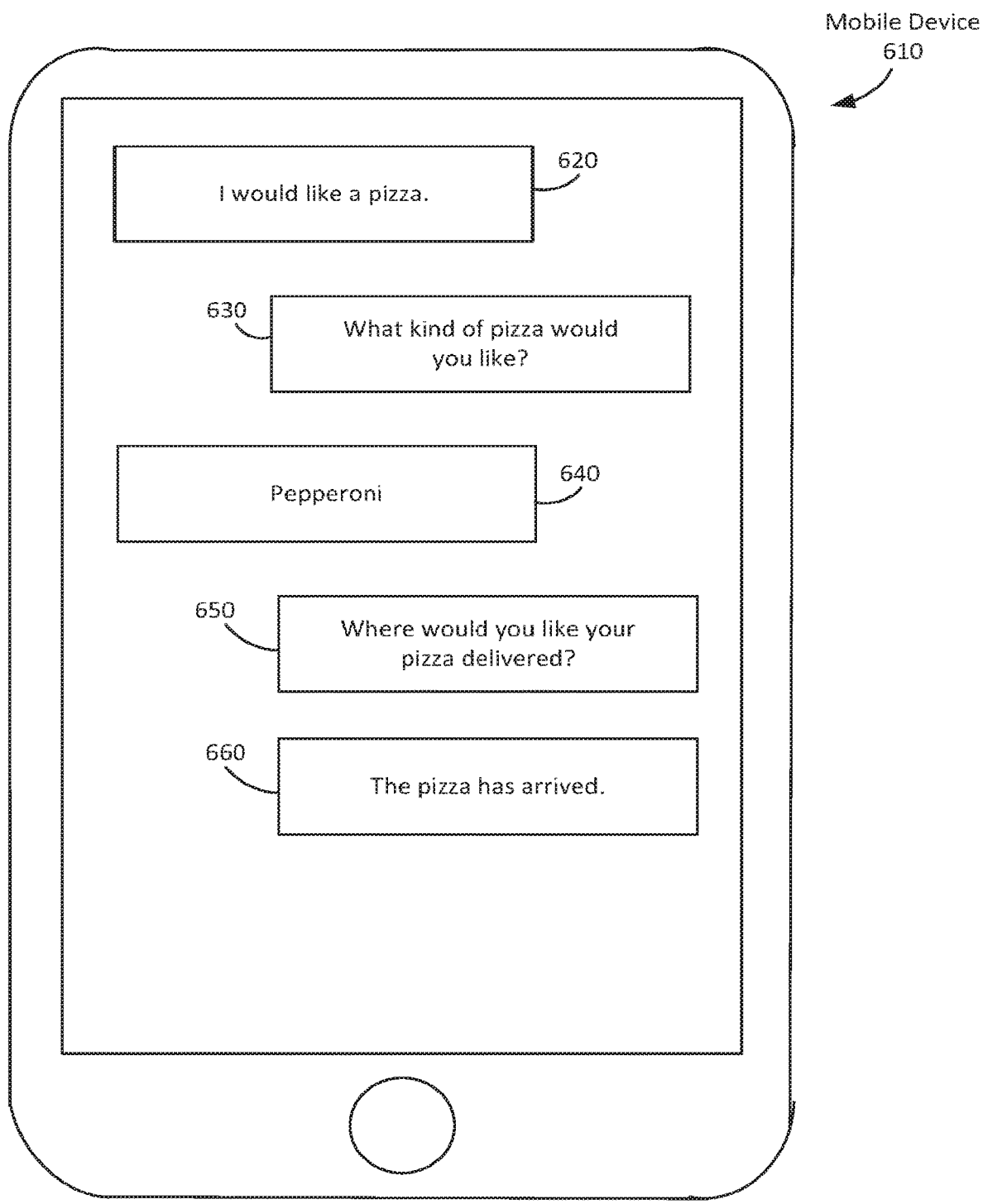
FIG. 6 illustrates an example of a bot server responding using a different messaging application than a previous message was received.

FIG. 6 illustrates an example of a bot server responding using a different messaging application than a previous message was received. In particular, the messages 620, 630, 640, 650 can be included in a first conversation using a second messaging application as described in FIG. 5A. However, the bot server, using the bot code, can determine to send a fifth message 660 to the user using a first messaging application rather than the second messaging application even though the last communication was in the second messaging application (e.g., the sixth message 565).

The bot server can determine to send the fifth message 660 to the user using the first messaging application for many reasons. For example, the user can indicate a preference for messages to be sent using the first messaging application. For another example, the bot server can determine that the user is not reading a message sent to the second messaging application. In such an example, the bot server can use information such as time elapsed since the message was sent or received and degree of urgency that the user received the fifth message 660. For another example, the bot server can determine that the first messaging application includes an option that the second messaging application does not include and that would present the information of the fifth message 660 better. For example, the first messaging application can allow a particular widget while the second messaging application does not.

Figure 7:
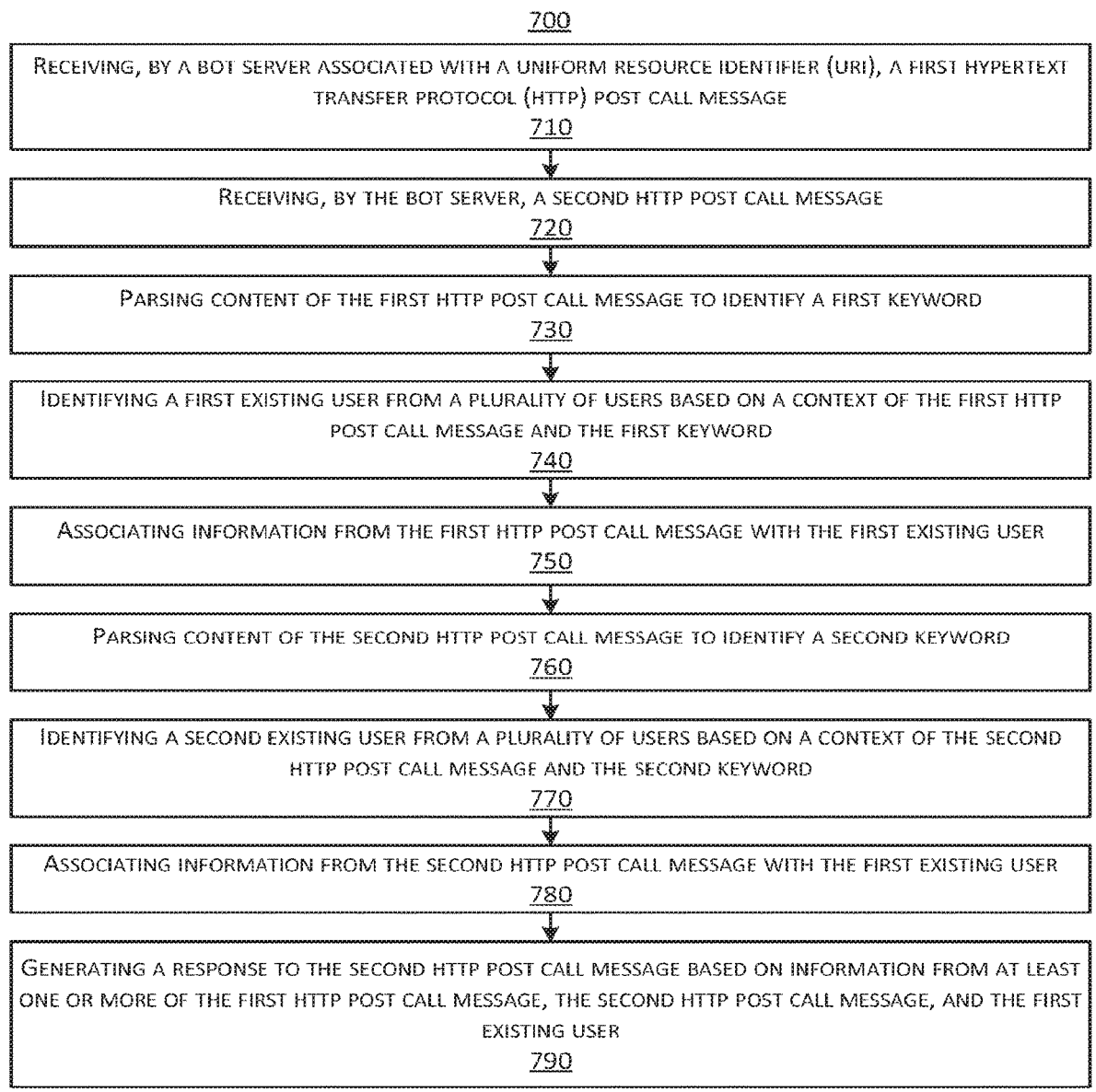
FIG. 7 is a flowchart illustrating an example of a process for associating a plurality of messages with a user.

FIG. 7 is a flowchart illustrating an example of a process for associating a plurality of messages with a user (or account). In some aspects, the process 700 can be performed by a bot server. While specific examples might be given of a bot server, one of ordinary skill in the art will appreciate that other devices can be included in the process 700.

The process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 710, the process 700 includes receiving a first hypertext transfer protocol (HTTP) post call message. In some examples, the first HTTP post call message can be received by a bot server associated with a uniform resource identifier (URI). The first HTTP post call message can be associated with a first user and be directed to the URI from a first messaging application server. In some examples, the first messaging application server can be associated with one of FACEBOOK® Messenger, WHATSAPP® instant messaging software, WECHAT® mobile text and voice messaging communication service, KIK® Messenger, TELEGRAM® Messenger, and SKYPE MOBILE®. In some examples, at least a portion of the content of the first HTTP post call message can be sent to the first messaging application server from a first mobile device. The first HTTP post call message can include a natural-language interaction with the bot server.

At step 720, the process 700 further includes receiving a second HTTP post call message. In some examples, the second HTTP post call message can be received by the bot server. The second HTTP post call message can be associated with a second user and be directed to the URI from a second messaging application server. In some examples, the second messaging application server can be different than the first messaging application server. In some examples, an identification of the first user can be different than an identification of the second user. In some examples, the second messaging application server can be associated with one of FACEBOOK® Messenger, WHATSAPP® instant messaging software, WECHAT® mobile text and voice messaging communication service, KIK® Messenger, TELEGRAM® Messenger, and SKYPE MOBILE'. In such examples, the first messaging application server can be different than the second messaging application server. In other examples, the first messaging application server can be the same as the second messaging application server. In such examples, the first user and the second user can include different identifications. In some examples, at least a portion of content of the second HTTP post call message can be sent to the second messaging application server from a second mobile device. The second HTTP post call message can include a natural-language interaction with the bot server.

At step 730, the process 700 further includes parsing content of the first HTTP post call message to identify a first keyword. At step 740, the process 700 further includes identifying a first existing user from a plurality of users based on a context of the first HTTP post call message and the first keyword. In some examples, the first existing user can be identified for the first HTTP post call message. At step 750, the process 700 further includes associating information from the first HTTP post call message with the first existing user.

At step 760, the process 700 further includes parsing content of the second HTTP post call message to identify a second keyword. At step 770, the process 700 further includes identifying a second existing user from a plurality of users based on a context of the second message and the second keyword. In some examples, the second existing user can be identified for the second HTTP post call message. In some examples, the second existing user can be the first existing user. At step 780, the process 700 further includes associating information from the second HTTP post call message with the first existing user.

At step 790, the process 700 further includes generating a response to the second HTTP post call message based on information from at least one or more of the first HTTP post call message, the second HTTP post call message, and the first existing user. In some examples, the response to the second HTTP post call message can be sent using the first messaging application server. In some examples, information from at least one or more of the first HTTP post call message, the second HTTP post call message, the response, the first messaging application server, the second messaging application server, the first user, and the second user is associated with a session.

In some examples, the process 700 can further include associating the first existing user with an enterprise account. The enterprise account can be separate from a messaging application server.

D. Server Collaboration

In some examples, the sessionizer 152 can also manage sessions between bot servers. In such examples, a session between one or more users and a first bot server can be maintained by the sessionizer 152. The session can include information associated with the first bot server in a first location of the session. The session can also include information associated with a second bot server in a second location of the session. The first location and the second location can be different. By having information associated with each bot server in a different location, overwriting of information can be avoided.

In some examples, a first bot server can determine to hand off, or transfer, a user, an account, and/or a session to a second bot server. In such examples, a session of the first bot server can be transferred to the second bot server such that the second bot server can have information in the session that the first bot server collected, saved, and/or received. For example, a first bot server can be associated with a human resource center. The first bot server can determine to send a user to a second bot server to receive a service from the second bot server. In such an example, the second bot server can benefit from information stored or saved by the first bot server.

To facilitate a hand off, the first bot server can send a message to the second bot server, just as a user would send a message to the second bot server. The message can cause a sessionizer associated with the second bot server to reconfigure a session from the first bot server to the second bot server. In other examples, the first bot server can send a message to another component of the second bot server, such as a load balancing component, a message-in queue, or the message processor pipeline. For an example, a hand off message can be:

```
{
    "channel": {
        "tenant_id": "DemoTenant",
        "client_data": {
            "channel_user_id": "1103645269000000",
            "type": "facebook",
            "chat_id": "1103645269000000"
        },
        "type": "facebook",
    "client_id": "facebook"
    "from_bot_id": "DemoBot",
    "to_bot_id": "TargetBot",
    },
    "id": "411fc848-350b-47de-89c3-a0ecee314401",
    "delegation_parameters": {
        "param1": "value1",
        "param2": "value2"
    },
    "type": "delegation"
}
```

In some examples, session information can be isolated between bot servers. For example, when a hand off occurs, the session information from the first bot server and the session information from the second bot server can be saved separately.

In some examples, the second bot server can transfer the session back to the first bot server. The transfer can occur when the second bot server completed its purpose. In some examples, the second bot server can send a message to the sessionizer of the first bot server, as discussed above, to change the session back to the first bot server. The transfer can also occur when the first bot server cancels the hand off. For example, the first bot server can determine that the second bot server is taking too long. In such an example, the first bot server can send a message to the sessionizer of the second bot server to change the session back to the first bot server. For example, a message to return a session from the second bot server back to the first bot server can be:

```
{
    "channel": {
        "tenant_id": "DemoTenant",
        "client_data": {
            "channel_user_id": "1103645269000000",
            "type": "facebook",
            "chat_id": "1103645269000000"
        },
        "type": "facebook",
        "client_id": "facebook"
        "from_bot_id": "TargetBot",
        "to_bot_id": "DemoBot",
    },
    "id": "411fc848-350b-47de-89c3-a0ecee314401",
    "retrun_values": {
        "return1": "value1",
        "return2": "value2"
    },
    "type": "delegation_return"
}
```

To illustrate, an example of a new employee at an enterprise can be described. The new employee can have several tasks that they must complete in the beginning. For example, an email can be issued, a laptop can be ordered, and an office can be assigned. However, the tasks can each be associated with a different person at the enterprise. In such an example, a bot server can be associated with each task. And each bot server can communicate with the other bot servers to provide enhanced efficiency.

Figure 8A:
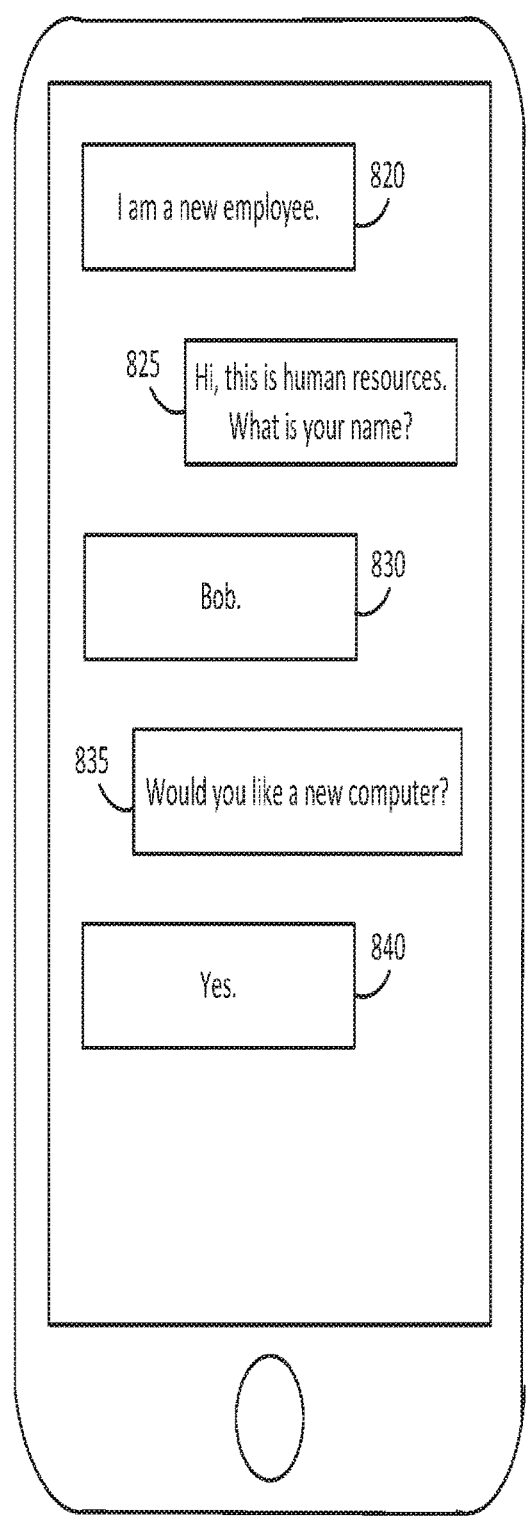
FIG. 8A illustrates an example of a hand off between a first bot server and a second bot server during a single conversation.
Figure 8B:
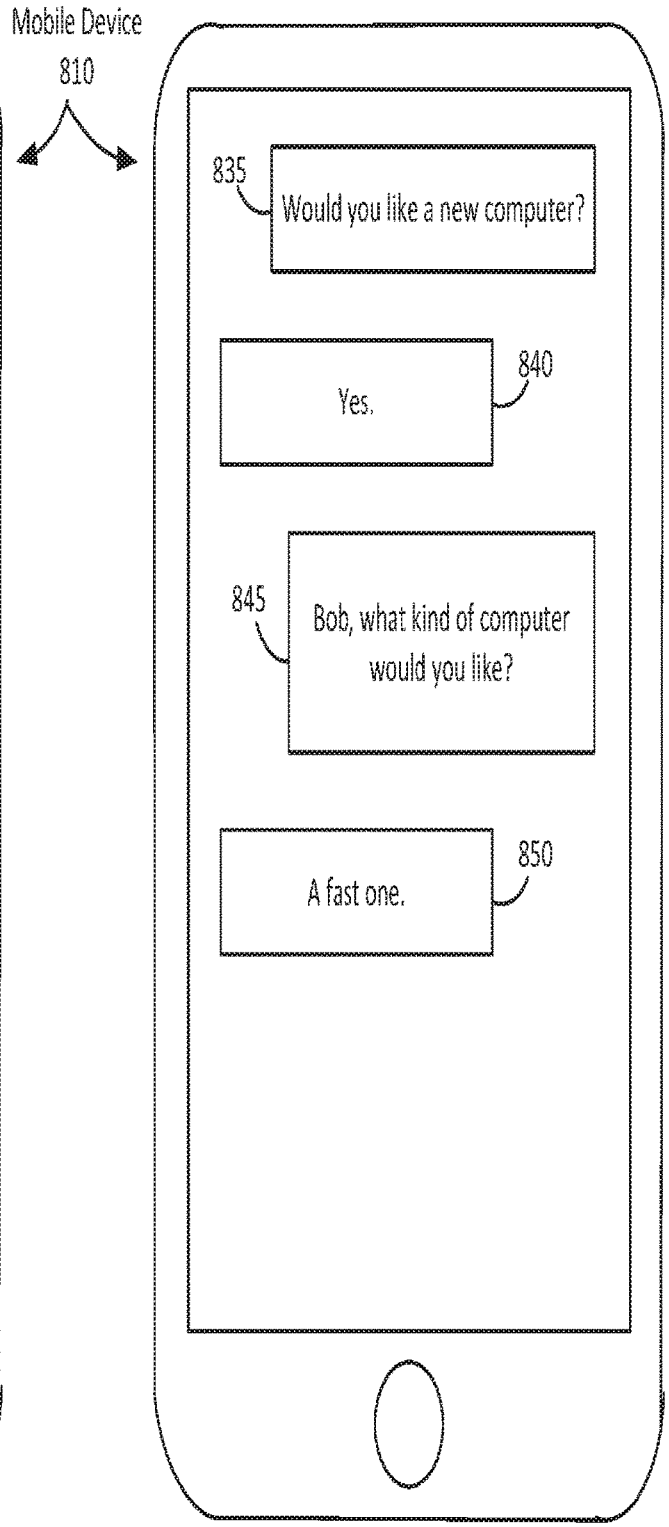
FIG. 8B illustrates further conversations of an example of a hand off between a first bot server and a second bot server during a single conversation.

FIGS. 8A-8B illustrate an example of a hand off between a first bot server and a second bot server during a single conversation. For purposes of FIGS. 8A-8B, a conversation in FIG. 8B should be seen as a continuation of a conversation in FIG. 8A. The single conversation can be related to a new employee at an enterprise. Rather than having the new employee individually contact several entities at the enterprise, examples herein allow the employee to use a single message thread in a messaging application installed on a mobile device 810.

For example, the user can send a first message 820 to the first bot server in a chat window of the messaging application installed on the mobile device 810. The first message 820 can be sent to a messaging application server associated with the messaging application. The messaging application server can send the first message 820 to the first bot server. The first bot server, using bot code, can respond to the first message 820 with a second message 825 which includes "Hi, this is human resources. What is your name?" The user can respond to the second message 825 with a third message 830, which includes "Bob." The first bot server can save "Bob" as the name of the user in a session associated with the user.

The first bot server can reply to the third message with a fourth message 835, asking whether the user would "like a new computer." By the user responding "Yes." in a fifth message 840 to the fourth message 835, the bot code of the first bot server can determine that the session should be handed off to a second bot server. The second bot server can be associated with ordering computers, a first step for the new employee. To facilitate the hand off, the first bot server can send a transfer request to the second bot server. The transfer request can be received at a connector or a load balancer, depending on the setup of the second bot server. In some examples, the transfer request can be sent to a different element of the second bot server, including a message-in queue or a sessionizer. The transfer request can cause the session associated with the user to be unassociated with the first bot server and associated with the second bot server such that one or more new messages received that are associated with the session would be received by the second bot server rather than the first bot server.

In some examples, the one or more new messages can be received by the second bot server rather than the first bot server because the URI associated with the first bot server can be changed. For example, the URI can be assigned to the second bot server rather than the first bot server by reconfiguring the first bot server and the second bot server. For another example, a message can be sent to the messaging application server to change the URI for a session such that a messaging application server sends new messages to the second bot server. For another example, the URI can be associated with a managing server, the managing server receiving all messages to one or more bot servers. The managing server can then send messages to a correct bot server. For another example, the first bot server can act as an intermediary for the second bot server, forwarding messages received by the first bot server to the second bot server.

Now, rather than the messages being responded to by the first bot server, the messages can be responded to by the second bot server through the messaging application server. However, the messages can still be included in the chat window, as if the second bot server is the first bot server. In response to the transfer request, and the affirmative answer by the user in the fifth message 840, the second bot server can send a sixth message 845 to the user. The sixth message 845 can include: "Bob, what kind of computer would you like?" In such examples, the user can be unaware that a different bot server is communicating with the user. The user can respond to the sixth message 845 with a seventh message 850. The conversation between the user and the second bot server can continue until the second bot server has completed its purpose (e.g., ordering a computer for Bob). When the second bot server has completed its purpose, the second bot server can either send the user back to the first bot server, send the user to a third bot server, or complete the conversation (transfer between servers can be performed similarly as described above).

Figure 9:
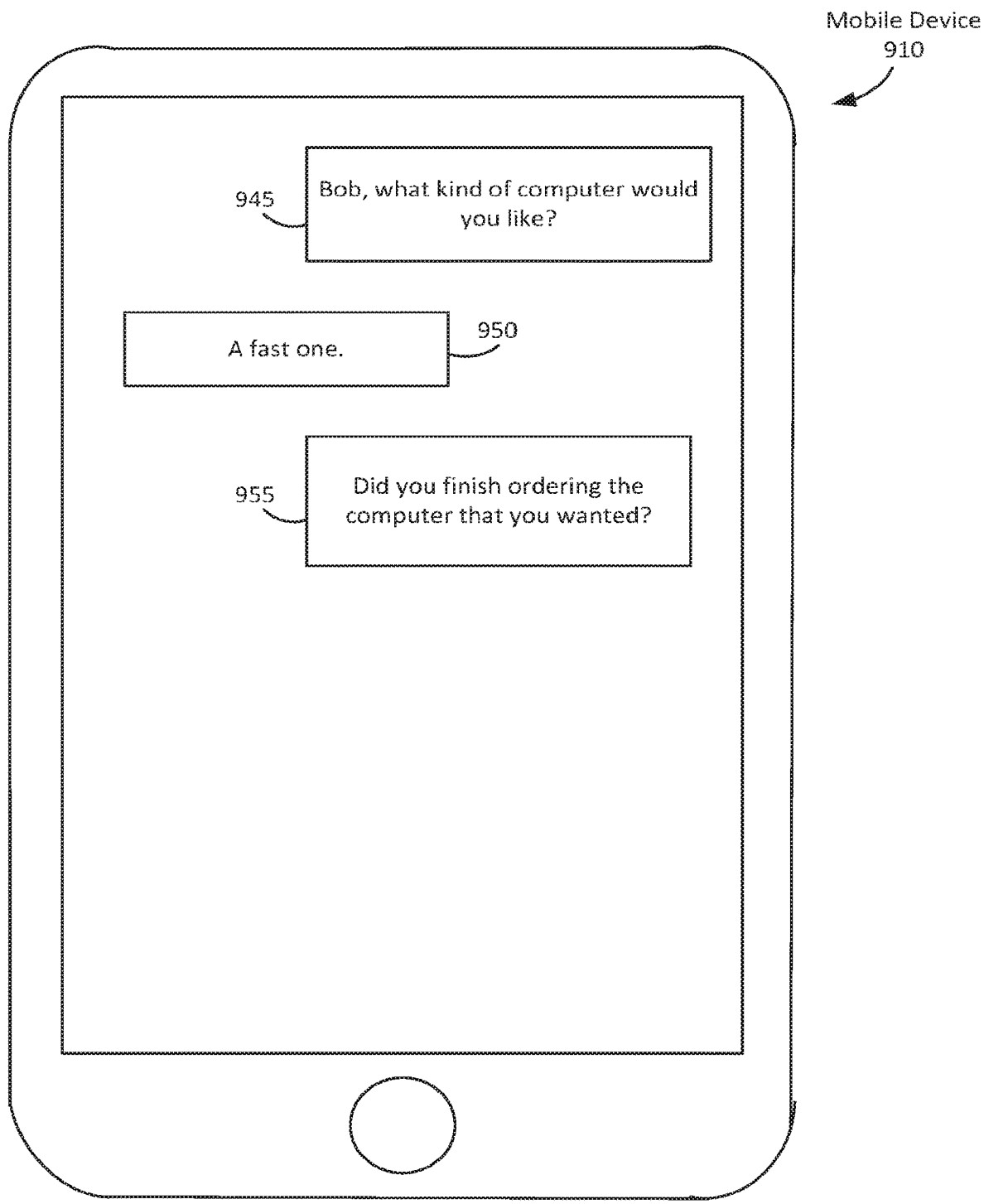
FIG. 9 illustrates an example of a hand off between a first bot server and a second bot server after the second bot server times out according to the first bot server.

FIG. 9 illustrates an example of a hand off between a first bot server and a second bot server after the second bot server times out according to the first bot server. In such an example, the first bot server can set a timer for the second bot server to complete its purpose. For example, the first bot server can determine that the second bot server should finish its purpose in 10 minutes. When the timer expires, the first bot server can send a message to the second bot server to request a status of a conversation between the user and the second bot server. If the second bot server responds to the first bot server that the second bot server is still processing the user, the first user can either determine to terminate the hand off with the second bot server (and return the user to the first bot server), set a new timer for the second bot server to complete its purpose (which operates similarly as described above), or do nothing.

To terminate the hand off, the first bot server can send a message to the second bot server. The message can be sent to a connector, a load-balancer, or a sessionizer, depending on the setup of the first and second bot server. The message can cause the session to be unassociated with the second bot server and associated with the first bot server similarly as described above in FIG. 8. By terminating the hand off with the second bot server, examples herein can handle a situation where bot code of the second bot server lags, fails, or freezes.

For example, after the user sent a seventh message 950 (similar to the seventh message 850), the first bot server can determine that the first bot server should terminate the hand off to the second bot server. By terminating the hand off to the second bot server, a session is unassociated with the second bot server and associated with the first bot server as described above. After the hand off, the first bot server can send an eighth message 955 to the user asking: "Did you finish ordering the computer that you wanted?" The first bot server can then continue the conversation with the user.

In other examples, the first bot server can determine that the second bot server failed to complete. In such examples, the first bot server can forgo sending the eighth message 955 and proceed with the conversation with knowledge that the second bot server failed to complete. The first bot server can determine that the second bot server failed to complete by analyzing the session.

Figure 10:
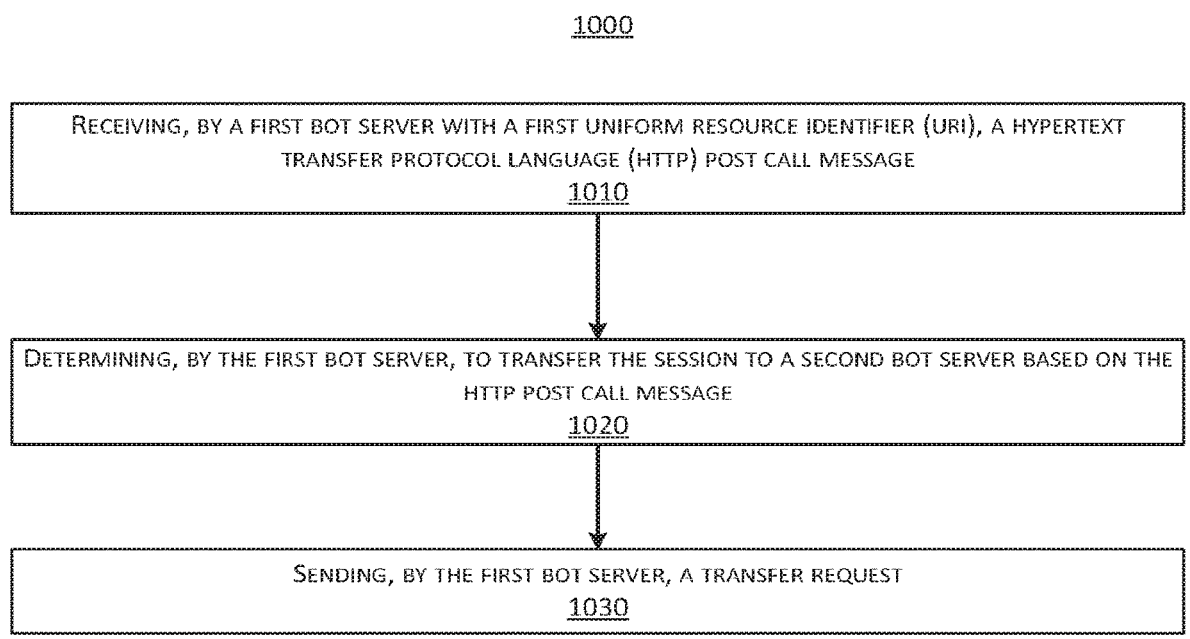
FIG. 10 is a flowchart illustrating an example of a process for server collaboration.

FIG. 10 is a flowchart illustrating an example of a process 1000 for server collaboration. In some aspects, the process 1000 can be performed by a bot server. While specific examples might be given of a bot server, one of ordinary skill in the art will appreciate that other devices can be included in the process 1000.

The process 1000 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 1010, the process 1000 includes receiving a hypertext transfer protocol (HTTP) post call message. In some examples, the HTTP post call message can be received by a first bot server with a first uniform resource identifier (URI). The HTTP post call message can be associated with a user and be directed to the URI from a messaging application server. In some examples, information from the HTTP post call message can be associated with a session. In some examples, the HTTP post call message can include a natural-language interaction. In some examples, the messaging application server can be associated with one of FACEBOOK® Messenger, WHATSAPP® instant messaging software, WECHAT® mobile text and voice messaging communication service, KIK® Messenger, TELEGRAM® Messenger, and SKYPE MOBILE®. In some examples, at least a portion of content of the HTTP post call message is sent to the messaging application server from a mobile device.

At step 1020, the process 1000 further includes determining to transfer the session to a second bot server based on the HTTP post call message. In some examples, the determination to transfer can be by the first bot server. In some examples, the second bot server can include a second URI.

At step 1030, the process 1000 further includes sending a transfer request by the first bot server. In some examples, the transfer request can cause the session to be unassociated with the first bot server and associated with the second bot server. In some examples, information associated with the first bot server can be saved separately in the session from information associated with the second bot server.

In some examples, the process 1000 can further include sending a return request by either the first bot server or the second bot server. The return request can cause the session to be unassociated with the second bot server and associated with the first bot server. In some examples, the return request can be sent after an amount of time has passed since the transfer request was sent or received.

E. Example Systems

Figure 11:
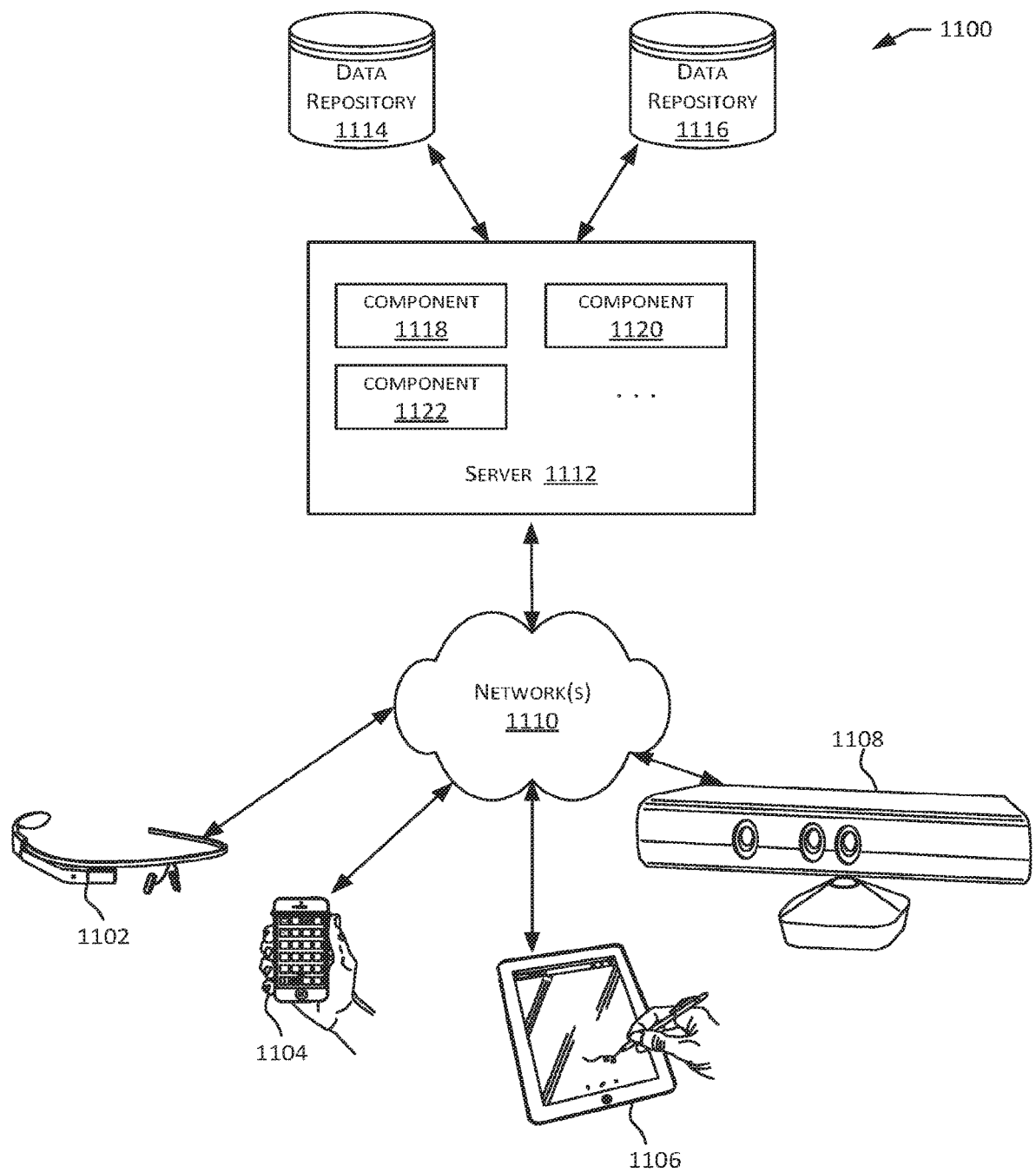
FIG. 11 illustrates an example of a distributed system.

FIG. 11 depicts a simplified diagram of a distributed system 1100. Distributed system 1100 includes one or more client computing devices 1102, 1104, 1106, and 1108, which each can be configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various examples, server 1112 may be adapted to run one or more services or software applications provided by one or more of the components of the distributed system 1100. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some examples, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In FIG. 11, the software components 1118, 1120 and 1122 of distributed system 1100 are shown as being implemented on server 1112. In other examples, one or more of the components of distributed system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The example shown in the figure is thus one example of a distributed system for implementing an example system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet Protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software-defined networking. In various examples, server 1112 may be adapted to run one or more services or software applications described in the foregoing disclosure. For example, server 1112 may correspond to a server for performing processing described above according to an example of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of examples, databases 1114 and 1116 may reside in a storage-area network (SAN). Similarly, any necessary files for performing the functions attributed to server 1112 may be stored locally on server 1112 and/or remotely, as appropriate. In one set of examples, databases 1114 and 1116 may include relational databases, such as databases provided by Oracle, that are adapted to store, update, and retrieve data in response to SQL-formatted commands.

Figure 12:
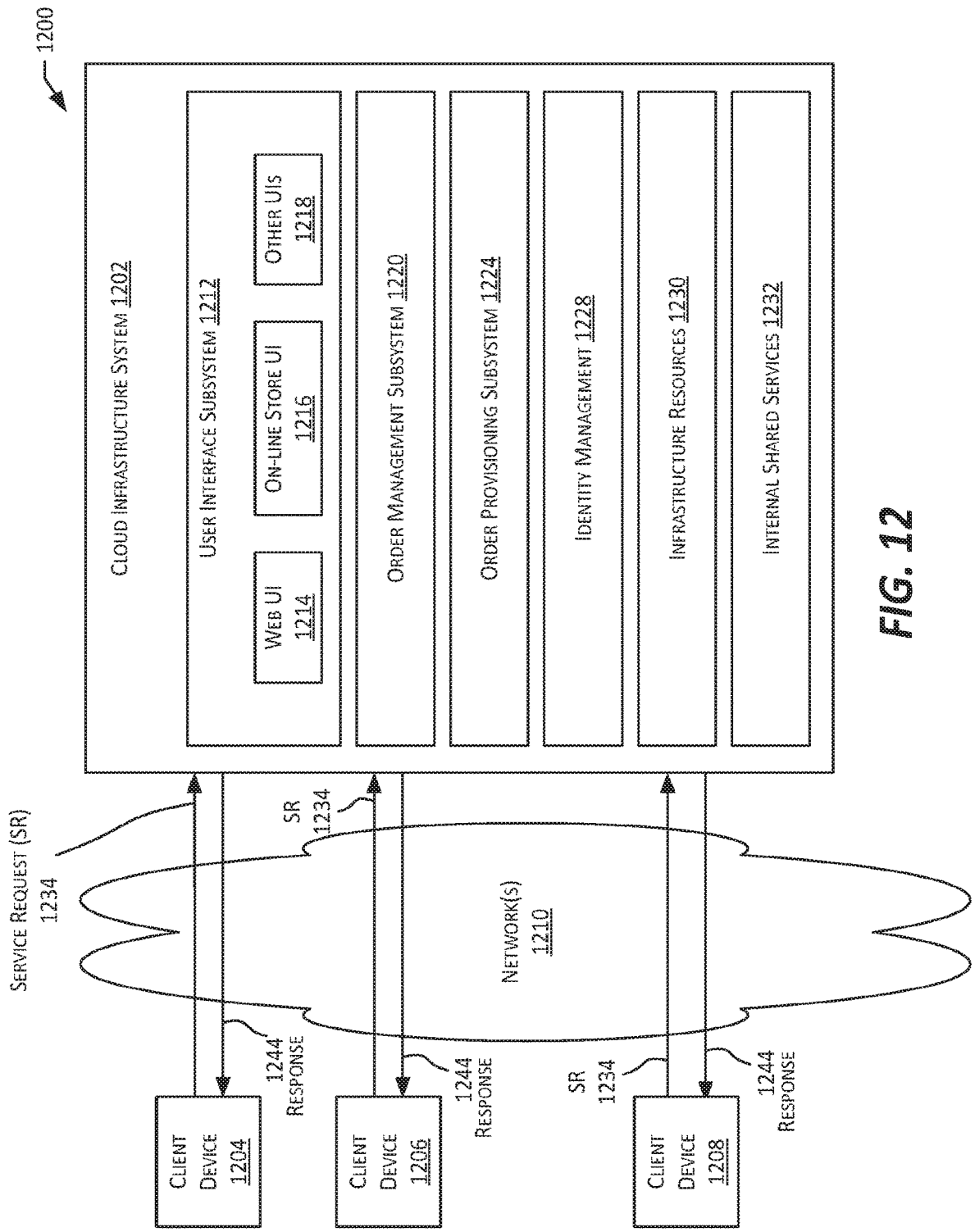
FIG. 12 is a simplified block diagram of components of a system environment.

FIG. 12 is a simplified block diagram of one or more components of a system environment 1200 by which services provided by one or more components may be offered as cloud services. In the illustrated example, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 may have other components than those depicted. Further, the example shown is only one example of a cloud infrastructure system that may incorporate an example of this disclosure. In some other examples, cloud infrastructure system 1202 may have more or fewer components than shown in FIG. 12, may combine two or more components, or may have a different configuration or arrangement of components.

Client computing devices 1204, 1206, and 1208 may be devices similar to those described above for 1102, 1104, 1106, and 1108. Although exemplary system environment 1200 is shown with three client computing devices, any number of client computing devices may be supported.

Other devices, such as devices with sensors, may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1210.

Cloud infrastructure system 1202 may comprise one or more computers and/or servers that may include those described above for server 1112.

In certain examples, services provided by the cloud infrastructure system may include a host of services that are made available to users of the cloud infrastructure system on demand, such as online data storage and backup solutions, web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premise servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain examples, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing, or the like). By leveraging an ability of an example to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various examples, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some examples, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some examples, the services provided by cloud infrastructure system 1202 may include, without limitation, application services, platform services, and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some examples, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform services. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some examples, platform services provided by the cloud infrastructure system may include database cloud services, middleware cloud services (e.g., Oracle Fusion Middleware services), and Java cloud services. In one example, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain examples, cloud infrastructure system 1202 may also include infrastructure resources 1230 for providing the resources used to provide various services to customers of the cloud infrastructure system. In one example, infrastructure resources 1230 may include pre-integrated and optimized combinations of hardware, such as servers, storage, and networking resources to execute the services provided by the PaaS platform and the SaaS platform.

In some examples, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain examples, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain examples, cloud infrastructure system 1202 may provide comprehensive management of cloud services (e.g., SaaS, PaaS, and IaaS services) in the cloud infrastructure system. In one example, cloud management functionality may include capabilities for provisioning, managing and tracking a customer's subscription received by cloud infrastructure system 1202, and the like.

In one example, as depicted in FIG. 12, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain examples, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain examples, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain examples, cloud infrastructure system 1200 may include an identity management module 1228. Identity management module 1228 may be configured to provide identity services, such as access management and authorization services in cloud infrastructure system 1200. In some examples, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
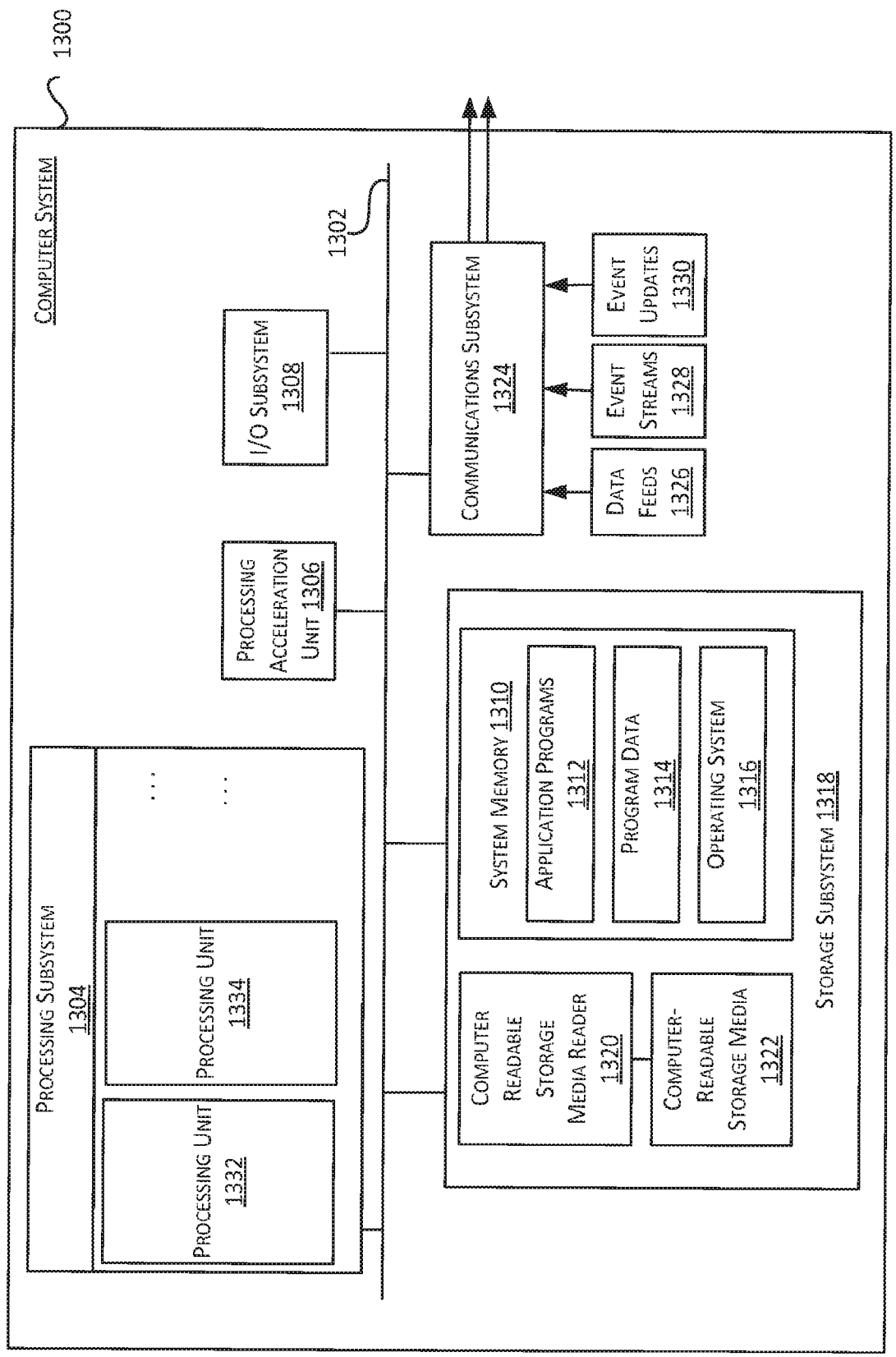
FIG. 13 illustrates an example of a computer system.

FIG. 13 illustrates an example of a computer system 1300, in which various examples of the present disclosure may be implemented. The computer system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), can control the operation of computer system 1300. One or more processors may be included in processing unit 1304. These processors may include single core or multicore processors. In certain examples, processing unit 904 may be implemented as one or more independent processing units 1332 and/or 1334 with single or multicore processors included in each processing unit. In other examples, processing unit 1304 may also be implemented as a quad-core processing unit formed by integrating two dual-core processors into a single chip.

In various examples, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that includes software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some examples. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some examples communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples communications subsystem 1324 can provide wired network connectivity (e.g., Ethernet) in addition to or instead of a wireless interface.

In some examples, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various examples.

In the foregoing specification, aspects of this disclosure are described with reference to specific examples thereof, but those skilled in the art will recognize that this disclosure is not limited thereto. Various features and aspects of the above-described disclosure may be used individually or jointly. Further, examples can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method for server collaboration, the method comprising:
   receiving, by a first bot server associated with a first uniform resource identifier (URI), a hypertext transfer protocol (HTTP) post call message from a messaging application server, wherein the HTTP post call message is associated with a user communicating with the messaging application server, and wherein information from the HTTP post call message is associated with a session;
   determining, by the first bot server, to transfer the session to a second bot server based on the HTTP post call message, wherein the second bot server is associated with a second URI;
   sending, by the first bot server, a transfer request, wherein the transfer request causes the session to be unassociated with the first bot server and associated with the second bot server;
   setting, by the first bot server, a timer for completion of operations to be performed by the second bot server, the operations being associated with the transfer request;
   in response to determining the timer has expired, determining, by the first bot server, that the operations have yet to be completed by the second bot server; and
   based at least in part on determining the operations have yet to be completed by the second bot server, transmitting, by the first bot server, an additional transfer request, wherein transmitting the additional transfer request causes the session to be unassociated with the second bot server and associated with the first bot server, wherein the first bot server subsequently performs the operations.

2. The method of claim 1, wherein information associated with the first bot server is saved separately in the session from information associated with the second bot server.

3. The method of claim 1, further comprising:
   sending a return request by the second bot server, wherein the return request causes the session to be unassociated with the second bot server and associated with the first bot server.

4. The method of claim 3, wherein the return request is sent from the second bot server after the second bot server is finished with the session.

5. The method of claim 1, further comprising:
   sending a cancelation by the first bot server, wherein the cancelation causes the session to be unassociated with the second bot server and associated with the first bot server.

6. The method of claim 1, wherein the HTTP post call message includes a natural-language interaction.

7. The method of claim 1, wherein the messaging application server is associated with one of FACEBOOK® Messenger application, WHATSAPP® instant messaging software, WECHAT® mobile text and voice messaging communication service, KIK® Messenger instant messaging application, TELEGRAM® Messenger messaging application, or SKYPE MOBILE® video call application, and wherein at least a portion of content of the HTTP post call message is sent to the messaging application server from a mobile device.

8. A system for server collaboration, the system comprising a first bot server and a second bot server, wherein the first bot server comprises:

one or more processors; and a non-transitory computer-readable medium containing instructions that, when executed by the one or more processors, cause the first bot server to:

receive a hypertext transfer protocol (HTTP) post call message from a messaging application server, wherein the HTTP post call message is associated with a user communicating with the messaging application server, wherein information from the HTTP post call message is associated with a session, and wherein the first bot server is associated with a first uniform resource identifier (URI);

determine to transfer the session to the second bot server based on the HTTP post call message, wherein the second bot server is associated with a second URI;

send a transfer request, wherein the transfer request causes the session to be unassociated with the first bot server and associated with the second bot server;

set a timer for completion of operations to be performed by the second bot server, the operations being associated with the transfer request;

in response to determining the timer has expired, determine that the operations have yet to be completed by the second bot server; and based at least in part on determining the operations have yet to be completed by the second bot server, transmit an additional transfer request, wherein transmitting the additional transfer request causes the session to be unassociated with the second bot server and associated with the first bot server, wherein the first bot server subsequently performs the operations.

9. The system of claim 8, wherein information associated with the first bot server is saved separately in the session from information associated with the second bot server.

10. The system of claim 8, further comprising instructions that, when executed by the one or more processors, cause the first bot server to send a return request by the second bot server, wherein the return request causes the session to be unassociated with the second bot server and associated with the first bot server.

11. The system of claim 10, wherein the return request is sent from the second bot server after the second bot server is finished with the session.

12. The system of claim 8, further comprising instructions that, when executed by the one or more processors, cause the first bot server to send a cancelation to the second bot server, wherein sending the cancelation causes the session to be unassociated with the second bot server and associated with the first bot server.

13. The system of claim 8, wherein the HTTP post call message includes a natural-language interaction.

14. The system of claim 8, wherein the messaging application server is associated with one of FACEBOOK® Messenger application, WHATSAPP® instant messaging software, WECHAT® mobile text and voice messaging communication service, KIK® Messenger instant messaging application, TELEGRAM® Messenger messaging application, or SKYPE MOBILE® video call application, and wherein at least a portion of content of the HTTP post call message is sent to the messaging application server from a mobile device.

15. A computer-program product tangibly embodied in a non-transitory machine-readable storage medium for server collaboration, including instructions that, when executed by one or more processors of a first bot server, cause the first bot server to:

receive a hypertext transfer protocol (HTTP) post call message from a messaging application server, wherein the HTTP post call message is associated with a user communicating with the messaging application server, wherein information from the HTTP post call message is associated with a session, and wherein the first bot server is associated with a first uniform resource identifier (URI);

determine to transfer the session to a second bot server based on the HTTP post call message, wherein the second bot server is associated with a second URI;

send a transfer request, wherein the transfer request causes the session to be unassociated with the first bot server and associated with the second bot server;

set a timer for completion of operations to be performed by the second bot server, the operations being associated with the transfer request;

in response to determining the timer has expired, determine that the operations have yet to be completed by the second bot server; and based at least in part on determining the operations have yet to be completed by the second bot server, transmit an additional transfer request, wherein transmitting the additional transfer request causes the session to be unassociated with the second bot server and associated with the first bot server, wherein the first bot server subsequently performs the operations.

16. The computer-program product of claim 15, wherein information associated with the first bot server is saved separately in the session from information associated with the second bot server.

17. The computer-program product of claim 15, further including instructions that, when executed by the one or more processors, cause the first bot server to send a return request by the second bot server, wherein the return request causes the session to be unassociated with the second bot server and associated with the first bot server.

18. The computer-program product of claim 17, wherein the return request is sent from the second bot server after the second bot server is finished with the session.

19. The computer-program product of claim 15, further including instructions that, when executed by the one or more processors, cause the first bot server to send a cancelation to the second bot server, wherein the cancelation causes the session to be unassociated with the second bot server and associated with the first bot server.

20. The computer-program product of claim 15, wherein the HTTP post call message includes natural-language interaction.

* * * * *

UNITED STATES PATENT AND TRADEMARK OFFICE
CERTIFICATE OF CORRECTION

PATENT NO. : 10,848,572 B2  
APPLICATION NO. : 16/284135  
DATED : November 24, 2020  
INVENTOR(S) : Sagar et al.

Page 1 of 1

It is certified that error appears in the above-identified patent and that said Letters Patent is hereby corrected as shown below:

On the Title Page

On page 2, Column 2, item (56) under Other Publications, Line 26, delete "Meduim," and insert -- Medium, --, therefor.

In the Specification

In Column 1, Line 10, delete "10,270,864" and insert -- 10,270,864, --, therefor.

In Column 2, Line 6, delete "MOBILE." and insert -- MOBILE®. --, therefor.

In Column 19, Line 20, delete "MOBILE'." and insert -- MOBILE®. --, therefor.

In Column 21, Line 19, delete ""retrun_values":" and insert -- "return_values": --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*